(12) United States Patent
Hong et al.

(10) Patent No.: US 10,975,343 B2
(45) Date of Patent: Apr. 13, 2021

(54) BEVERAGE MAKER

(71) Applicant: LG ELECTRONICS INC., Seoul (KR)

(72) Inventors: Jinpyo Hong, Seoul (KR); Daewoong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 316 days.

(21) Appl. No.: 16/193,870

(22) Filed: Nov. 16, 2018

(65) Prior Publication Data

US 2019/0153370 A1     May 23, 2019

(30) Foreign Application Priority Data

Nov. 17, 2017   (KR) .................. 10-2017-0154319

(51) Int. Cl.
  *C12C 11/00*     (2006.01)
  *C12C 13/10*     (2006.01)
  *B67D 1/00*      (2006.01)

(52) U.S. Cl.
  CPC ............. *C12C 13/10* (2013.01); *C12C 11/00* (2013.01)

(58) Field of Classification Search
  CPC .......... A47J 31/41; A47J 31/60; C12C 11/00; C12C 11/006; C12C 13/00; C12C 13/10; B08B 9/0321; B08B 9/0325; B08B 9/08; B08B 9/093; B67D 1/0016; B67D 1/07; B67D 1/0888; B67D 1/0895; B67D 1/1247

USPC ..... 99/275, 276, 277, 278, 288, 289 D, 293, 99/294, 300, 305, 316, 323, 323.1, 323.2
See application file for complete search history.

(56) References Cited

U.S. PATENT DOCUMENTS

| 2008/0175951 | A1* | 7/2008 | Rule ........................ | C12G 1/02 99/277 |
| 2015/0203801 | A1* | 7/2015 | Perez Narcue .......... | C12G 1/02 99/276 |
| 2015/0218499 | A1* | 8/2015 | Frye ...................... | C12C 11/006 99/276 |
| 2016/0145550 | A1* | 5/2016 | Bahns .................... | C12C 11/11 99/278 |
| 2019/0055503 | A1* | 2/2019 | Sanders ................. | C12C 13/08 |

FOREIGN PATENT DOCUMENTS

KR     10-0793258 B1     1/2008

* cited by examiner

*Primary Examiner* — Hung D Nguyen
(74) *Attorney, Agent, or Firm* — Dentons US LLP

(57) ABSTRACT

A beverage maker including a hinge shaft, a fermentation tank having a space therein and configured to rotatably support the hinge shaft, a fermentation lid connected to the hinge shaft through a bracket and rotating about the hinge shaft to open and close the space, and at least one tube through which a fluid passes, wherein a hinge shaft accommodating space accommodating the at least one tube is defined inside the hinge shaft, and at least one hinge shaft hole through which the at least one tube extends to the outside of the hinge shaft space is defined in the hinge shaft to minimize damage or contamination of the at least one tube and allow the at least one tube to be minimally visible when the fermentation lid is opened.

15 Claims, 10 Drawing Sheets

BEVERAGE MAKER

CROSS-REFERENCE TO RELATED APPLICATION

The present application claims priority under 35 U.S.C. 119 and 35 U.S.C. 365 to Korean Patent Application No. 10-2017-0154319, filed on Nov. 17, 2017, which is hereby incorporated by reference in its entirety.

BACKGROUND

The present disclosure relates to a beverage maker apparatus, and more particularly, to a beverage maker apparatus including a fermentation tank and a fermentation lid.

Beverages are collectively referred to as drinkable liquids such as alcohol, juice, water, tea, etc.

Beer, for example, is an alcoholic beverage made by making juice of malt sprouting from barley, filtering the juice, adding hop, and fermenting the juice by using the yeast.

Homemade beer (also referred to as "house beer") is becoming popular—especially because it can be made into a variety of types and tastes.

The ingredients for making beer may include water, malt, hop, yeast, flavor additives, and the like.

The yeast, which is called leaven, may be added to malt to ferment the malt and help to produce alcohol and carbonic acid.

Flavor additives, such as fruit, syrup, vanilla beans, etc., are additives that enhance the taste of beer.

The house beer may be made through three stages, first, a wort production stage, second, a fermentation stage, and third, an aging stage. It may take about two to three weeks from the wort production step to the aging stage.

It is important for the house beer to maintain an optimum temperature during fermentation for the beer making process to be as convenient as possible.

An example of the beverage maker may be an alcoholic drink maker that is disclosed in Korean patent Registration No. 10-0793258 B1 (published on Jan. 10, 2008). The alcoholic drink maker includes a tank body having an inner space, a lid sealing the tank body, a clamp fixing the tank body and the lid, a steamer-combined filter box put into the tank body, and a filtering cloth put into the steamer-combined filter box.

A user using the domestic alcoholic drink maker opens the lid to put a predetermined amount of water and beverage ingredients into the tank body and then manipulates the domestic alcoholic drink maker after closing the lid. The alcoholic drink maker may control a temperature of the tank body by using a cooling device or a heating device to perform the fermentation.

The beverage maker according to the related art has limitations in which the foreign substances such as dust are put into the water or the beverage ingredients because the water and the beverage ingredients are directly put into the tank body when the lid is open. The present invention is directed to improvements in the beverage maker apparatus.

SUMMARY

The foregoing embodiments provide a beverage maker in which at least one tube is minimally visible from the outside to realize an elegant outer appearance and minimizes damage or contamination of the at least one tube.

The foregoing embodiments also provide a beverage maker in which beverage ingredients are put through at least one tube to make a clean beverage.

According to one embodiment, a beverage maker includes: a hinge shaft; a fermentation tank having a space therein and configured to rotatably support the hinge shaft; a fermentation lid connected to the hinge shaft through a bracket and rotating about the hinge shaft to open and close the space; and The at least one tube through which a fluid passes, wherein a hinge shaft accommodating space accommodating the at least one tube is defined inside the hinge shaft, and at least one hinge shaft hole through which the at least one tube extends to the outside of the hinge shaft space is defined in the hinge shaft.

The at least one tube may extend to the fermentation lid along the hinge shaft and the bracket.

The hinge shaft may have a hollow shape, and the at least one hinge shaft hole may be opened to the hinge shaft in a radial direction of the hinge shaft.

A bracket space in which the at least one tube is accommodated may be defined inside the bracket, and the at least one at least one tube may be hidden by the bracket.

The at least one hinge shaft hole may be opened to the bracket space.

A fermentation lid hole which communicates the bracket space and through which the at least one tube passes may be defined in the lid. An inner space in which the at least one tube is accommodated may be defined inside the lid.

The fermentation tank may include a pair of hinge shaft supports configured to rotatably support the hinge shaft.

The bracket may include: a hinge shaft fixing portion disposed between the pair of hinge shaft supports to surround a portion of the hinge shaft; and an elongation portion extending from the hinge shaft fixing portion, connected to the fermentation lid, and having the bracket space therein.

Each of the elongation portion and the bracket space may have a shape that is bent at least once.

The bracket may include: a main bracket on which the hinge shaft fixing portion fixed to the hinge shaft is disposed; and a tube cover configured to surround the at least one tube together with the main bracket.

The hinge shaft may have an opened end. One end of the at least one tube may extend to the outside of the hinge shaft through the one end of the hinge shaft.

A fitting may be connected to the at least one tube, and an outer tube may be connected to the fitting.

The fitting may include: a tube connecting portion connected to the at least one tube; and an outer tube connecting portion to which the outer tube is connected.

The tube connecting portion may have a size less than that of the hinge shaft space. A portion of the tube connecting portion may be disposed between the at least one tube and the hinge shaft. The outer tube connecting portion may be connected to the outer tube at the outside of the hinge shaft.

A plurality of tubes may be accommodated in the hinge shaft space together with each other. The hinge shaft may have both ends that are opened. One of the plurality of tubes may extend to the outside of the hinge shaft through one end of the hinge shaft. The other of the plurality of tubes may extend in a direction opposite to the one tube of the plurality of tubes through the other end of the hinge shaft.

A main fitting to which a main outer tube is connected may be connected to one of the plurality of tubes. A sub fitting to which a sub outer fitting is connected may be connected to the other of the plurality of tubes. The main fitting and the sub fitting may be spaced apart from each other.

The details of one or more embodiments are set forth in the accompanying drawings and the description below. Other features will be apparent from the description and drawings, and from the claims.

BRIEF DESCRIPTION OF THE DRAWINGS

To achieve the foregoing objects, and in accordance with the purpose of the invention as embodied and broadly described herein.

DETAILED DESCRIPTION OF THE EMBODIMENTS

Figure 1:
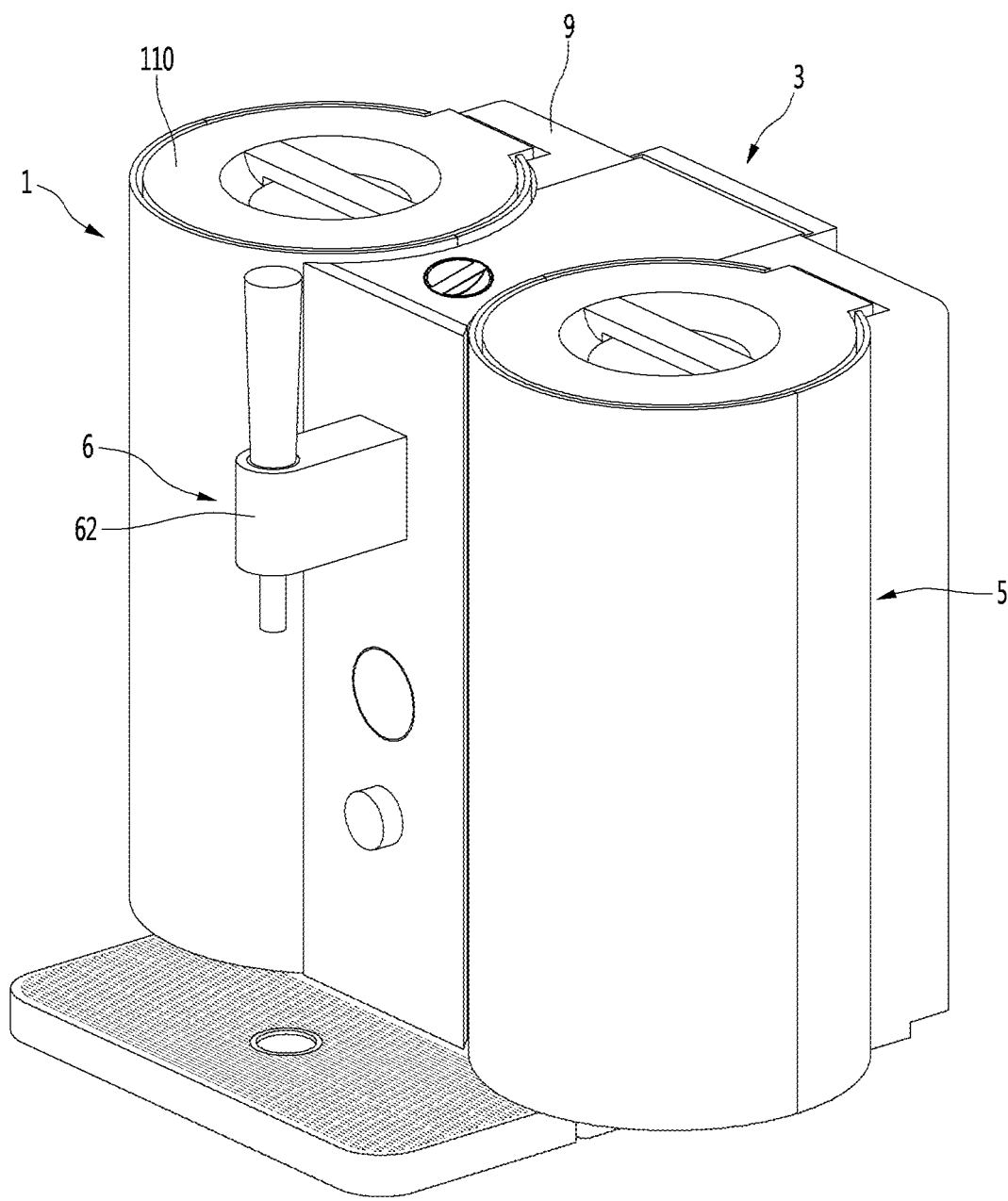
FIG. 1 is a perspective view of a beverage maker according to an embodiment of the present invention.

Hereinafter, detailed embodiments of the present invention will be described in detail with reference to the accompanying drawings.

It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be added in subsequent filings along with figures, but they are not required to understand the present disclosure. The inventors assert and exercise their right to their own lexicography. Quoted terms are defined explicitly, but quotation marks are not used when a term is defined implicitly. Terms may be defined, either explicitly or implicitly, here in the Detailed Description of the Preferred Embodiments and/or elsewhere in the application file.

Throughout this document, use of the optional plural "(s)", "(es)", or "(ies)" means that one or more of the indicated feature is present. For example, "processor(s)" means "one or more processors" or equivalently "at least one processor".

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest with regard to a destination or other subject may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Various terminology used herein can imply direct or indirect, full or partial, temporary or permanent, action or inaction. For example, when an element is referred to as being "on," "connected" or "coupled" to another element, then the element can be directly on, connected or coupled to the other element or intervening elements can be present, including indirect or direct variants. In contrast, when an element is referred to as being "directly connected" or "directly coupled" to another element, there are no intervening elements present.

Likewise, as used herein, a term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, features described with respect to certain embodiments may be combined in or with various other embodiments in any permutational or combinatory manner. Different aspects or elements of example embodiments, as disclosed herein, may be combined in a similar manner.

The term "combination", "combinatory," or "combinations thereof" as used herein refers to all permutations and combinations of listed items preceding that term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. A skilled artisan will understand that typically there is no limit on a number of items or terms in any combination, unless otherwise apparent from the context.

Similarly, as used herein, various singular forms "a," "an" and "the" are intended to include various plural forms as well, unless context clearly indicates otherwise. For example, a term "a" or "an" shall mean "one or more," even though a phrase "one or more" is also used herein.

Moreover, terms "comprises," "includes" or "comprising," "including" when used in this specification, specify a presence of stated features, integers, steps, operations, elements, or components, but do not preclude a presence and/or addition of one or more other features, integers, steps, operations, elements, components, or groups thereof. Furthermore, when this disclosure states that something is "based on" something else, then such statement refers to a basis which may be based on one or more other things as well. In other words, unless expressly indicated otherwise, as used herein "based on" inclusively means "based at least in part on" or "based at least partially on."

Additionally, although terms first, second, and others can be used herein to describe various elements, components, regions, layers, or sections, these elements, components, regions, layers, or sections should not necessarily be limited by such terms. Rather, these terms are used to distinguish one element, component, region, layer, or section from another element, component, region, layer, or section. As such, a first element, component, region, layer, or section discussed below could be termed a second element, component, region, layer, or section without departing from this disclosure.

Words such as "then," "next," etc. are not intended to limit the order of the steps; these words are simply used to guide the reader through the description of the methods.

Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

Figure 2:
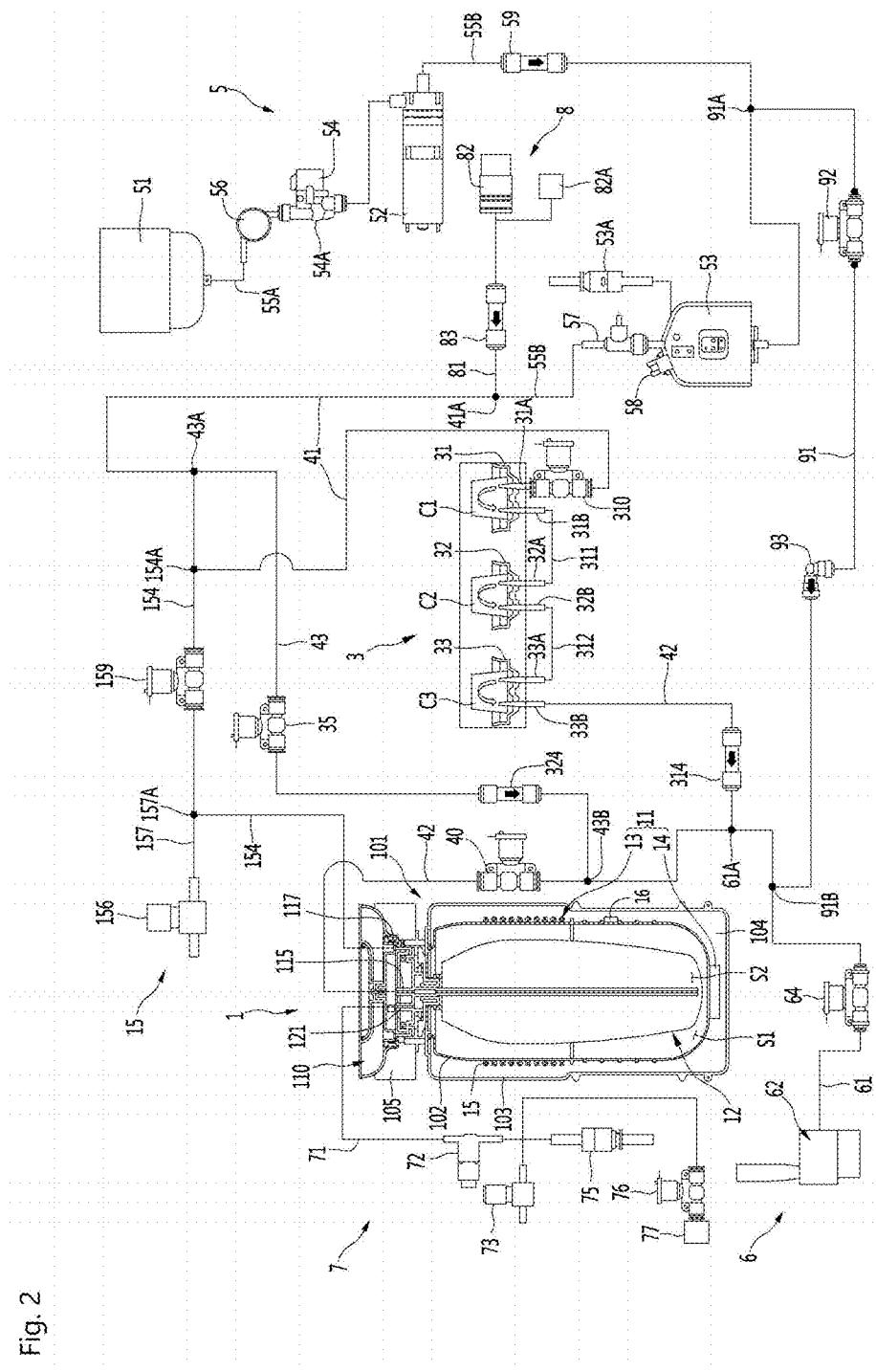
FIG. 2 is a view illustrating a configuration of the beverage maker according to an embodiment of the present invention.

Although the embodiments disclosed herein mostly describe beer as being the exemplary beverage made using a beverage maker, it is understood that the type of beverages is not limited to beer and can apply to any other beverage that is capable of being made by using the beverage maker. FIG. 1 is a perspective view of a beverage maker according to an embodiment of the present invention, and FIG. 2 is a view illustrating a configuration of the beverage maker according to an embodiment of the present invention.

A beverage maker may include a fermentation module 1. A beverage may be fermented in the fermentation module 1.

The beverage maker may include a temperature controller that controls an inner temperature of the fermentation module 1.

The beverage maker may include a water supply module 5. The water supply module 5 may supply water to the fermentation module 1.

The beverage maker may include ingredient supply module 3 provided with ingredient accommodating portion 31, 32, and 33 in which ingredients required for making the beverage are accommodated. It is understood that the ingredient supply module 3 is preferable but not necessary.

The beverage maker may include main channel 41 and 42 connecting the water supply module 5 to the fermentation module 1.

The beverage maker may include a beverage dispenser 6 for dispensing the beverage made in the fermentation module 1 to the outside.

The beverage dispenser 6 may be coupled to a second main channel 42. Thus, the beverage dispensed from the fermentation module 1 may be guided to the beverage dispenser 6 by passing through a portion of the second main channel 42.

The beverage maker may further include a gas discharger 7. The gas discharger 7 may be coupled to the fermentation module 1 to discharge a gas generated while the beverage is made.

The beverage maker may further include an air injector for injecting air. The air injector 8 may be coupled to the water supply module 5 or a first main channel 41. The air injector may include an air pump 82.

The beverage maker may further include an air controller 15 controlling a pressure between an inner wall of a fermentation tank 101 and an outer surface of a fermentation container 12.

The beverage maker may further include a sub channel 91. The sub channel 91 may connect the water supply module 5 to the beverage dispenser 6.

Hereinafter, the fermentation module 1 will be described in detail according to an embodiment of the invention.

The fermentation module 1 may include a fermentation tank 101 having a space S1 and a fermentation lid 110 opening and closing the space S1.

The fermentation tank 101 may include a fermentation case 103 and an inner fermentation tank 102 accommodated inside the fermentation case 103. The inner fermentation tank 102 is formed having the inner space S1. An insulation portion 104 may be provided between the fermentation case 103 and the inner fermentation tank 102. The fermentation tank 101 may further include a lid connector 105 on which the fermentation lid 110 is disposed.

Each of the fermentation case 103 and the inner fermentation tank 102 may be provided as an assembly of a plurality of members. The fermentation case 103 may form an outer appearance of the fermentation tank 101.

The fermentation lid 110 may seal the inside of the fermentation tank 101 and be disposed on the fermentation tank 101 to cover the opening S1. A main channel, particularly, a main channel connecting portion 115 coupled to a second main channel 42 may be provided in the fermentation lid 110.

A fermentation container 12 may be accommodated in the fermentation tank 101.

The fermentation container 12 may be provided as a separate container so that the beverage ingredients and the made beverage do not stain an inner wall of the fermentation tank 101. The fermentation container 12 may be separably disposed on the fermentation tank 101. The fermentation container 12 may be disposed on the fermentation tank 101 to ferment the beverage within the fermentation tank 101. After the fermentation container 12 is used, the fermentation container 12 may be removed and withdrawn to the outside of the fermentation tank 101.

The fermentation container 12 may be a pack or pod containing the ingredients for making the beverage. The fermentation container 12 may be made of a flexible material. Thus, the fermentation container 12 may be easily inserted into the fermentation tank 101 and be contracted and expanded by a pressure. However, this embodiment is not limited thereto. For example, the fermentation container 12 may be made of a PET material or the like.

The fermentation container 12 may have a beverage making space S2 in which the beverage ingredients are accommodated, and the beverage is made. The fermentation container 12 may have a size less than that of the inner space S1 of the fermentation tank 101 so that it can be accommodated therein.

The fermentation container 12 may be inserted and accommodated inside the fermentation tank 101 in the state in which the ingredients are contained in the fermentation container 12. The fermentation container 12 may also be inserted and accommodated inside the fermentation tank 101 in the state in which the fermentation lid 110 is open.

The fermentation lid 110 may seal the fermentation tank 101 after the fermentation container 12 is inserted into the fermentation tank 101. The fermentation container 12 may assist the fermentation of the ingredient in the state in which the fermentation container 12 is accommodated in the space S1 that is sealed by the fermentation tank 101 and the fermentation lid 107. The fermentation container 12 may be expanded by the pressure therein during the making of the beverage. The fermentation container 12 may be pressed by the air within the fermentation tank 101 when the beverage contained in the fermentation container 12 is dispensed, and the air is supplied between an inner surface of the fermentation tank 101 and the fermentation container 12.

The inner fermentation tank 102 may be disposed in the fermentation case 103. The inner fermentation tank 102 may have an outer circumference surface and a bottom surface, which are each spaced apart from the inner surface of the fermentation case 103. In more detail, the outer circumference the inner fermentation tank 102 may be spaced apart from an inner circumference of the fermentation case 103, and an outer bottom surface of the inner fermentation tank 102 may be spaced apart from an inner bottom surface of the fermentation case 103.

The insulation portion (not shown) may be provided between the fermentation case 103 and the inner fermentation tank 102. The insulation portion may be disposed in the fermentation case 103 and surround the inner fermentation tank 102. Thus, the temperature of the inner fermentation tank 102 may be maintained constant.

The insulation portion may be made of a material such as foamed polystyrene or polyurethane which has high thermal insulating performance and absorbs vibration, but is not limited to such materials.

The inner fermentation tank 102 may include a temperature sensor 16 for measuring the temperature of the inner fermentation tank 102.

The temperature sensor 16 may be mounted on a circumferential surface of the inner fermentation tank 102. The temperature sensor 16 may be disposed below an evaporator 15 wound around the inner fermentation tank 102.

Hereinafter, the temperature controller 11 will be described in detail according to an exemplary embodiment.

The temperature controller 11 may control an inner temperature of the fermentation tank 101. In more detail, the temperature controller 11 may change a temperature (increase or decrease the temperature) of the inner fermentation tank 102.

The temperature controller 11 may heat or cool the fermentation tank 102 to control a temperature of the fermentation tank 102 at an optimal temperature for fermenting the beverage. The optimal temperature may be different depending on the type of beverage.

The temperature controller 11 may include at least one of a refrigerant cycle device 13 and a heater 14. However, this embodiment is not limited thereto. For example, the temperature controller 11 may include a thermoelement TEM.

The refrigerant cycle device 13 may control the inner fermentation tank 102 to adjust a temperature of the inner fermentation tank 102. The refrigerant cycle device 13 may include a compressor, a condenser, an expansion mechanism, and an evaporator 15.

The evaporator 15 may be disposed to contact an outer surface of the fermentation tank 102. The evaporator 15 may be provided as an evaporation tube wound around an outer surface of the inner fermentation tank 102. The evaporator 15 may be accommodated between the inner fermentation tank 102 and the insulation portion to cool the inner fermentation tank 102 that is insulated by the insulation portion.

The temperature controller 11 may further include a heater 14 heating the inner fermentation tank 102. The heater 14 may be disposed to be in contact with the bottom surface of the inner fermentation tank 102. The heater 14 may be provided as a heat generation heater that generates heat when power is applied. The heater 14 may be provided as a plate heater, but is not limited thereto.

Thus, the natural convection of a fluid may be generated inside the inner fermentation tank 102 by the evaporator 15 and the heater 14, and temperature distribution inside the inner fermentation tank 102 and the fermentation container 12 may be uniform or constant.

Hereinafter, the main channel 41 and 42 and a bypass channel 43 will be described according to an embodiment of the invention.

As described above, the main channel 41 and 42 may include a first main channel 41 connecting the water supply module 5 to the ingredient supply module 3 and a second main channel 42 connecting the ingredient supply module 3 to the fermentation module 1.

That is, the first main channel 41 may guide water supplied from the water supply module 5 to the ingredient supply module 3, and the second main channel 42 may guide the mixture of the ingredients and the water, which are extracted from the ingredient supply module 3, to the fermentation module 1.

The first main channel 41 may have one end 41A coupled to the water supply module 5 and the other end coupled to the ingredient supply module 3, more particularly, an inlet of an initial ingredient accommodating portion 31, which will be described below in more detail.

An ingredient supply valve 310 for opening and closing the first main channel 41 may be installed in the first main channel 41. The ingredient supply valve 310 may be provided in the ingredient supply module 3.

The ingredient supply valve 310 may be opened in order to open the first main channel 41 when additives accommodated in the ingredient accommodating portions 31, 32, and 33 are put therein. The ingredient supply valve 310 may also be opened when the ingredient accommodating portions 31, 32, and 33 are cleaned to open the first main channel 41.

The second main channel 42 may have one end coupled to a main channel connecting portion 115 of the fermentation module 1 and the other end coupled to the ingredient supply module 3, more particularly, an outlet 33B of a final ingredient accommodating portion 33, which will be described below in more detail.

A main valve 40 for opening and closing the second main channel 42 may be installed in the second main channel 42. Also, a main check valve 314 for allowing the fluid to flow from the ingredient supply module 3 to the fermentation module 1 may be installed in the second main channel 42. The main check valve 314 may function to prevent the fluid from flowing back to the ingredient supply module 3.

The main check valve 314 may be disposed between the main valve 40 and the ingredient supply module 3 with respect to the second main channel 42.

The main valve 40 may be opened when the water is supplied to the fermentation container 12 to open the second main channel 42. The main valve 40 may be closed while the fermentation tank 101 is cooled to close the second main channel 42. The main valve 40 may be opened when the air is injected into the fermentation container 12 to open the second main channel 42. The main valve 40 may be opened when the additives are supplied into the fermentation container 1 to open the second main channel 42. The main valve 40 may be closed to seal the inside of the fermentation container 12 during the fermentation of the ingredients. The main valve 40 may be closed to seal the inside of the fermentation container 12 when the beverage is aged and stored. The main valve 40 may be opened when the beverage is dispensed by the beverage dispenser 6 to open the second main channel 4. The beverage within the fermentation container 1 may pass through the main valve 40 to flow to the beverage dispenser 6.

The first and second main channels 41 and 42 may be provided as a single continuous channel when the beverage maker does not include the ingredient supply module 3.

When the beverage maker includes the ingredient supply module 3, the beverage maker may further include a bypass channel configured to allow the water or the air to bypass the ingredient accommodating portions 31 and 32.

The bypass channel 43 may bypass the ingredient accommodating portions 31, 32, and 33 and then be coupled to the first main channel 41 and the second main channel 42.

The bypass channel 43 may have one end coupled to the first main channel 41 and the other end coupled to the second main channel 42. In more detail, the bypass channel 43 may have one end 43A coupled to the first main channel 41 between the water supply module 5 and the ingredient supply valve 310 and the other end 43B coupled to the second main channel 42 between the main valve 40 and the ingredient supply module 3.

A bypass valve 35 for opening and closing the bypass channel 43 may be installed in the bypass channel 43.

The bypass valve 35 may be opened when the water supplied from the water supply module 5 is supplied to the fermentation container 12 to open the bypass channel 43. The bypass valve 35 may be opened when the air injected from the air injector 8 is supplied to the fermentation container 12 to open the bypass channel 43. The bypass valve 35 may be opened when the bypass channel 43 is cleaned to open the bypass channel 43.

Also, a bypass check valve 324 allowing the fluid to flow from the first main channel 41 to the second main channel 42 may be installed in the bypass channel 43. That is, the fluid may flow only from the first main channel 41 to the second main channel 42 but may not flow in the opposite direction.

The bypass check valve 324 may be disposed between the bypass valve 35 and the second main channel 42 with respect to the bypass channel 43.

Hereinafter, the ingredient supply module 3 will be described in detail according to an exemplary embodiment.

When beer is made by using the beverage maker, the ingredients for making the beer may include water, malt, yeast, hop, flavouring additives, and the like.

The beverage maker may include the ingredient supply module 3 and the fermentation container 12. The ingredients for making the beverage may be accommodated to be divided into the ingredient supply module and fermentation container 12. More particularly, a portion of the ingredients for making the beverage may be accommodated in the fermentation container 12, and the remaining ingredients may be accommodated in the ingredient supply module 3. The ingredients accommodated in the ingredient supply module 3 may be supplied to the fermentation container 12 together with the water supplied from the water supply module 5 and mixed with the portion of the ingredients accommodated in the fermentation container 12.

For example, a main ingredient that is essential for making the beverage may be accommodated in the fermentation container 12, and the additives added to the main ingredient may be accommodated in the ingredient supply module 3. In this case, the additives accommodated in the ingredient supply module 3 may be mixed with the water supplied from the water supply module 5 and supplied to the fermentation container 12 and then be mixed with the main ingredient accommodated in the fermentation container 12.

For example, when the beer is made, the ingredients may be the malt of the malt, the yeast, the hop, and the flavouring additives. Also, the additive accommodated in the ingredient supply module 3 may be the other ingredient except for the malt of the ingredient for making the beer, such as, for example, the yeast, the hop, and the flavouring additives.

The beverage maker may include the fermentation container 12 but not the ingredient supply module 3. In this case, the main ingredient may be accommodated in the fermentation container 12, and the user may directly put the additives into the fermentation container 12.

If the beverage maker includes the ingredient supply module 3 and the fermentation container 12, the beverage may be more easily made. Hereinafter, the case in which the beverage maker includes the ingredient supply module 3 and the fermentation container, will be described as an example. However, this embodiment is not limited to the case in which the beverage maker includes all of the ingredient supply module 3 and the fermentation container 12.

The ingredients within the fermentation container 12 may be fermented as time elapses, and the beverage made in the fermentation container 12 may flow to the second main channel 42 through the main channel connecting portion 115 and also flow from the second main channel 42 to the beverage dispenser 6 so as to be dispensed.

The ingredients that are necessary for making the beverage may be accommodated in the ingredient supply module 3, and the water supplied from the water supply module 5 may pass through ingredient supply module 3. For example, when the beverage made in the beverage maker is beer, the ingredient accommodated in the ingredient supply module 3 may be yeast, hop, flavouring additives, and the like.

The ingredients accommodated in the ingredient supply module 3 may be directly accommodated into an ingredient accommodating portions 31, 32, and 33 provided in the ingredient supply module 3. At least one ingredient accommodating portion 31, 32, and 33 may be provided in the ingredient supply module 3. The plurality of ingredient accommodating portions 31, 32, and 33 may be provided in the ingredient supply module. In this case, the ingredient accommodating portions 31, 32, and 33 may be partitioned with respect to each other.

Inlets 31A, 32A, and 33A through which the fluid is introduced and outlets 31B, 32B, and 33B through which the fluid is discharged may be provided in the ingredient accommodating portions 31, 32, and 33, respectively. The fluid introduced into the inlet of one ingredient accommodating portion may be mixed with the ingredients within the ingredient accommodating portions and then discharged through the outlet.

The ingredients accommodated in the ingredient supply module 3 may be accommodated in capsule C1, C2, and C3. In this case, the capsule C1, C2, and C3 may be accommodated in the ingredient accommodating portion 31, 32, and 33, and the ingredient accommodating portion 31, 32, and 33 may be called a capsule mounting portion.

When the ingredients are accommodated in the capsules C1, C2, and C3, the ingredient supply module 3 may be configured so that the capsules C1, C2, and C3 are seated and withdrawn. The ingredient supply module may be provided as a capsule kit assembly in which the capsules C1, C2, and C3 are separably accommodated.

For example, a first additive, a second additive, and a third additive may be accommodated in the ingredient supply module 3. The first additive may be yeast, the second additive may be hop, and the third additive may be a flavouring additive. The ingredient supply module 3 may include a first capsule mounting portion 31 in which a first capsule C1 containing the first additive is accommodated, a second capsule mounting portion 32 in which a second capsule C2 containing the second additive is accommodated, and a third capsule mounting portion 33 in which a third capsule C3 containing the third additive is accommodated.

The ingredients contained in the ingredient accommodating portion or the capsules C1, C2, and C3 may be extracted by a water pressure of the water supplied from the water supply module 5.

When the ingredients are extracted by the water pressure, the water supplied from the water supply module 5 to the first main channel 41 may pass through the ingredient accommodating portion or the capsules C1, C2, and C3 and then be mixed with the ingredients, and the ingredients accommodated in the ingredient accommodating portion or the capsules C1, C2, and C3 may flow to the second main channel together with the water.

A plurality of additives different from each other may be accommodated to be divided in the ingredient supply module 3. For example, when the beer is made, the plurality of additives accommodated in the ingredient supply module 3 may be the yeast, the hop, and the flavouring additive, which are accommodated to be divided from each other.

When the plurality of ingredient accommodating portions are provided in the ingredient supply module 3, the plurality of ingredient accommodating portions 31, 32, and 33 may be connected in series to each other in a flow direction of the water.

In more detail, the ingredient supply module 3 may include at least one connecting channel 311 and 312 connecting the outlet of one ingredient accommodating portion of the plurality of ingredient accommodating portions 31, 32, and 33 to the inlet of the other ingredient accommodating portion.

Also, the plurality of ingredient accommodating portions 31, 32, and 33 may include an initial ingredient accommodating portion 31 and a final ingredient accommodating portion 33. The plurality of ingredient accommodating portions 31, 32, and 333 may further include an intermediate ingredient accommodating portion 32.

The inlet 31A of the initial ingredient accommodating portion 31 may be coupled to the first main channel 41, and the outlet 33B of the final ingredient accommodating portion 33 may be coupled to the second main channel 42.

The intermediate ingredient accommodating portion 32 may be disposed between the first ingredient accommodating portion 31 and the second ingredient accommodating portion 33 in the flow direction of the fluid. The inlet 32A and the outlet 32B of the intermediate ingredient accommodating portion 32 may be coupled to the connecting channels 311 and 312 different from each other.

As illustrated in FIG. 2, when three ingredient accommodating portions are provided in the ingredient supply module 3, the outlet 31B of the final ingredient accommodating portion 31 may be coupled to the inlet 32A of the intermediate ingredient accommodating portion 32 through the first connecting channel 311, and the outlet 32B of the intermediate ingredient accommodating portion 32 may be coupled to the inlet 33A of the final ingredient accommodating portion 33 through the second connecting channel 312.

In this case, the water introduced into the inlet 31A of the final ingredient accommodating portion 31 through the first main channel 41 may flow to the first connecting channel 311 through the outlet 31B together with the first additive accommodated in the initial ingredient accommodating portion 31.

The fluid (the mixture of the water and the first additive) introduced into the inlet 32A of the intermediate ingredient accommodating portion 32 through the first main channel 311 may flow to the second connecting channel 312 through the outlet 32B together with the second additive accommodated in the intermediate ingredient accommodating portion 32.

The fluid (the mixture of the water and the first and second additives) introduced into the inlet 33A of the final ingredient accommodating portion 33 through the second main channel 312 may flow to the second connecting channel 42 through the outlet 33B together with the third additive accommodated in the final ingredient accommodating portion 33.

The fluid (the mixture of the water and the first, second, and third additives) discharged through the second main channel 42 may be guided to the main channel connecting portion 115 of the fermentation module 1 and then introduced into the fermentation container 12.

However, the configuration of the ingredient supply module is not limited thereto. For example, when the intermediate ingredient accommodating portion is not provided, two ingredient accommodating portions may be provided in the ingredient supply module 3. In this case, one ingredient accommodating portion may be the initial ingredient accommodating portion, and the other ingredient accommodating portion may be the final ingredient accommodating portion. The outlet of the initial ingredient accommodating portion and the inlet of the final ingredient accommodating portion may be coupled to each other by the connecting channel.

For another example, when the intermediate ingredient accommodating portion is provided in plurality, four or more ingredient accommodating portions may be provided in the ingredient supply module 3. In this case, one ingredient accommodating portion may be the initial ingredient accommodating portion, the other ingredient accommodating portion may be the final ingredient accommodating portion, and the remaining ingredient accommodating portion may be the intermediate ingredient accommodating portion. In this case, since the connection between the ingredient accommodating portions in series is easily understood by the person skilled in the art, their detailed descriptions will be omitted.

Since the plurality of ingredient accommodating portions 31, 32, and 33 are connected in series to each other, the channel configuration of the ingredient supply module 3 may be simplified. Also, since the additives contained in the capsules C1, C2, and C3 may be simultaneously extracted, a time taken to extract the additives may decrease. Also, since the user does not have to worry about the mounting order of the capsules C1, C2, and C3, malfunction due to the mounting of the capsules C1, C2, and C3 in erroneous order may not occur. Also, the ingredient supply module 3 may be minimized in water leakage point to improve reliability.

When the ingredients accommodated in the ingredient supply module 3 are accommodated in the capsules C1, C2, and C3, the initial ingredient accommodating portion 31 may be called an initial capsule mounting portion, the intermediate ingredient accommodating portion 32 may be called an intermediate capsule mounting portion, and the final ingredient accommodating portion 33 may be a final capsule mounting portion.

Hereinafter, the water supply module 5 will be described in detail according to an exemplary embodiment.

The water supply module 5 may include a water tank 51, a water supply pump 52 for pumping water within the water tank 51, and a water supply heater 53 for heating the water pumped by the water supply pump 52.

The water supply module 5 may further include the water supply pump 52 for pumping water within the water tank 51 and the water supply heater 53 for heating the water pumped by the water supply pump 52.

The water tank 51 and the water supply pump 52 may be coupled to a water tank discharge channel 55A, and the water contained in the water tank 51 may be introduced into the water supply pump 52 through the water tank discharge channel 55A.

The water supply pump 52 and one end of the first main channel 41 may be coupled to a water supply channel 55B, and the water discharged from the water supply pump may be guided to the first main channel 41 through the water supply channel 55B.

A flow meter 56 for measuring a flow rate of the water discharged from the water tank 51 may be installed in the water tank discharge channel 55A.

Also, a flow rate control valve 54 for controlling the flow rate of the water discharged from the water tank 51 may be installed in the water tank discharge channel 55A. The flow rate control valve 54 may include a step-in motor.

A thermistor 54A for measuring a temperature of the water discharged from the water tank 51 may be installed in the water tank discharge channel 55A. The thermistor 54A may be built in the flow rate control valve 54.

A water supply check valve 59 for preventing the water from flow back to the water supply pump 52 may be installed in the water supply channel 55B.

The water supply heater 53 may be installed in the water supply channel 55B.

The water supply heater 53 may be a mold heater and include a heater case through which the water pumped by the water supply pump 52 passes and a heat generation heater installed in the heater case to heat the water introduced into the heater case.

A thermal fuse 58 for interrupting a circuit to cutoff current applied to the water supply heater 53 when a temperature is above a predetermined temperature may be installed in the water supply heater 53.

The water supply module 5 may further include a safety valve 53A. The safety valve 53A may communicate with the inside of the heater case of the water supply heater 53. The safety valve 53A may restrict a maximum internal pressure of the heater case. For example, the safety valve 53A may restrict a maximum internal pressure of the heater case to a pressure of about 3.0 bar (plus/minus 0.25 bar).

The water supply module 5 may further include a water supply temperature sensor 57 for measuring a temperature of the water passing through the water supply heater 53. The water supply temperature sensor 57 may be installed in the water supply heater 53. Alternatively, the water supply temperature sensor 57 may be disposed at a portion of the water supply channel 55B behind the water supply heater 53 in the flow direction of the water. Also, the water supply temperature sensor 57 may be installed in the first main channel 41.

When the water supply pump 52 is driven, the water within the water tank 51 may be introduced into the water supply pump 52 through the water tank discharge channel 55A, and the water discharged from the water supply pump 52 may be heated in the water supply heater 53 while flowing through the water supply channel 55B and then be guided to the first main channel 41.

Hereinafter, the beverage dispenser 6 will be described according to an embodiment of the invention.

The beverage dispenser 6 may be coupled to the second main channel 42.

In detail, the beverage dispenser 6 may include a dispenser 62 for dispensing the beverage and a beverage dispensing channel 61 connecting to the dispenser 62 to the second main channel 42.

The beverage dispensing channel 61 may have one end 61A coupled between the main check valve 314 and the main valve 40 with respect to the second main channel 42 and the other end coupled to the dispenser 62.

A beverage dispensing valve 64 for opening and closing the beverage dispensing channel 61 may be installed in the beverage dispensing channel 61.

The beverage dispensing valve 64 may be opened when the beverage is dispensed to open the beverage dispensing channel 61. The beverage dispensing valve 64 may be opened when residual water is removed to open the beverage dispensing channel 61. The beverage dispensing valve 64 may be opened when the beverage dispenser is cleaned to open the beverage dispensing channel 61.

An anti-foaming member (not shown) may be provided in the beverage dispensing channel 61, and an amount of foam of the beverage flowing from the second main passage 42 to the beverage dispensing channel 61 may be decreased while passing through the anti-foaming part. A mesh structure for filtering the foam may be provided in the anti-foaming member.

When the beverage is dispensed, the beverage dispensing valve 64 may be opened. When the beverage is not dispensed, the beverage dispensing valve 64 may be maintained in a closed state.

Hereinafter, the gas discharger 7 will be described in detail according to an exemplary embodiment.

The gas discharger 7 may be coupled to the fermentation module 1 and be configured to discharge a gas generated in the fermentation container 12.

The gas discharger 7 may include a gas discharge channel 71 coupled to the fermentation module, a gas pressure sensor 72 installed in the gas discharge channel 71, and a gas discharge valve 73 coupled behind the gas pressure sensor 72 in the gas discharge channel 71 in the gas discharge direction.

The gas discharge channel 71 may be coupled to the fermentation module 1, particularly, the fermentation lid 110. A gas discharge channel connecting portion 121 to which the gas discharge channel 71 may be coupled may be provided in the fermentation lid 110.

The gas within the fermentation container 12 may flow into the gas discharge channel 71 and the gas pressure sensor 72 through the gas discharge channel connecting portion 121. The gas pressure sensor 72 may be configured to detect a pressure of the gas discharged to the gas discharge channel 71 through the gas discharge channel connecting portion 121 within the fermentation container 12.

The gas discharge valve 73 may be turned to be opened (open state) when the air is injected into the fermentation container 12 by the air injector 8. The beverage maker may substantially uniformly mix the malt with the water by injecting the air into the fermentation container 12. Here, foam generated in the liquid malt may be discharged from the upper portion of the fermentation container 12 to the outside through the gas discharge channel 71 and the gas discharge valve 73.

The gas discharge valve 73 may be turned on (on state) to detect fermentation during the fermentation process and then tuned off (off state) to be closed.

The gas discharger 7 may further include the safety valve 75 coupled to the gas discharge channel 71. The safety valve 75 may be coupled behind the gas pressure sensor 71 in the gas discharge channel 71 in the gas discharge direction. The safety valve 75 may restrict a maximum pressure of the fermentation container 12 and the gas discharge channel 71. For example, the safety valve 75 may restrict the maximum pressure of the fermentation container 12 and the gas discharge channel 71 to a pressure of about 3.0 bar (plus/minus 0.25 bar).

The gas discharger 7 may further include a pressure release valve 76.

The pressure release valve 76 may be coupled to the gas discharge channel 71. The pressure release valve 76 and the gas discharge valve 73 may be selectively opened/closed (e.g., on/off state).

The gas discharge channel 71 may be branched to be respectively coupled to the gas discharge valve 73 and the pressure release valve 76.

A noise reducing device 77 may be mounted on the pressure release valve 76 to reduce noise emitting therefrom. The noise reducing device 77 may include at least one of an orifice structure and a muffler structure.

Even though the pressure release valve 76 is opened, the internal pressure of the fermentation container 12 may gradually decrease by the noise reducing device 77.

As the fermentation process of the beverage progresses, the pressure release valve 76 may be opened to release the pressure when the internal pressure of the fermentation container increases. The noise reducing device 77 may effectively reduce noise generated due to a difference in pressure of the inside and outside of the fermentation container 12.

The pressure release valve 76 may be controlled to be opened/closed (e.g., on/off state) while the beverage ingredients are fermented.

Hereinafter, the air injector 8 will be described according to an embodiment of the present invention.

The air injector 8 may be coupled to the water supply module 55B or the first main channel 41 to inject air. Hereinafter, for convenience of description, the case in which the air injector 8 is coupled to the water supply channel 55B will be described as an example.

The air injector 8 may be coupled to an opposite side of a sub channel 91, which will be described later, with respect to the water supply heater 53.

In this case, the air injected into the air injector 8 may pass through the water supply heater 53 to flow to the sub channel 91 together with the residual water within the water supply heater 53. Thus, the residual water within the water supply heater 53 may be removed to maintain a clean state of the water supply heater 53.

Alternatively, the air injected from the air injector 8 to the first main channel 41 may successively pass through the bypass channel 43 and the second main channel 42 and then be injected into the fermentation container 12. Thus, stirring or aeration may be performed in the fermentation container 12.

Alternatively, the air injected from the air injector 8 to the first main channel 41 may be guided to the ingredient supply module 3 to flow to the capsule mounting portions 31, 32, and 33. The residual water or residues within the capsules C1, C2, and C3 or the capsule mounting portions 31, 32, and 33 may flow the second main channel 42 by the air injected by the air injector 8. The capsules C1, C2, and C3 and the capsule mounting portions 31, 32, and 33 may be cleanly maintained by the air injected by the air injector 8.

The air injector 8 may include an air injection channel coupled to the water supply channel 55B or the first main channel 41 and an air pump 82 coupled to the air injection channel 81. The air pump 82 may pump the air into the air injection channel 81.

An air injection check valve 83 preventing the water flowing to the water supply channel 55B by the water supply pump from being introduced into the air pump 82 through the air injection channel 81 may be installed in the air injection channel 81.

The air injector 8 may further include an air filter 82A. The air filter 82A may be provided at a suction side of the air pump 82, and thus, external air may be suctioned into the air pump 82 by passing through the air filter 82A. Thus, the air pump 82 may inject clean air into the air injection channel 81.

Hereinafter, the air controller 15 will be described in detail according to an embodiment of the present invention.

The air controller 15 may be configured to control a pressure between an inner wall of the fermentation tank 101 and an outer surface of the fermentation container 12.

The air controller 15 may supply air into a space provided between the outer surface of the fermentation container 12 and the inner wall of the fermentation tank 101. On the other hand, the air controller 15 may exhaust the air within the space between the outer wall of the fermentation container 12 and the inner wall of the fermentation tank 101 to the outside thereof.

The air controller 15 may include an air supply channel 154 coupled to the fermentation module 1 and an exhaust channel 157 coupled to the air supply channel 154 to exhaust the air to the outside.

The air supply channel 154 may have one end coupled to the first main channel 41 and the other end coupled to the fermentation module 1.

The air supply channel 154 may be coupled to the fermentation module 1, particularly, the fermentation lid 110. An air supply channel connecting portion 117 to which the air supply channel 154 is coupled may be provided in the fermentation module 1. The air supply channel connecting portion 117 may communicate with the space between the inner wall of the fermentation tank 101 and the outer surface of the fermentation container 12.

The air injected from the air injector 8 to the first main channel 41 may be guided between the outer surface of the fermentation container 12 and the inner wall of the fermentation tank 101 through the air supply channel 154.

The air injector 8 may function as an air supplier for supplying the air into the space between the fermentation container 12 and the fermentation tank 101 together with the air supply channel 154.

The beverage within the fermentation container 12 may be pressed by the fermentation container 12 that is pushed by the air. When the main valve 40 and the beverage dispensing valve 64 are opened, the beverage may pass through the main channel connecting portion 115 to flow the second main channel 42. The beverage flowing from the fermentation container 12 to the second main channel 42 may be dispensed to the outside of the beverage maker through the beverage dispenser 6.

The air pump 82 may supply air so that a predetermined pressure occurs between the fermentation container 12 and the fermentation tank 101. Thus, a pressure at which the beverage within the fermentation container 12 is easily dispensed may be occur between the fermentation container 12 and the fermentation tank 101.

The air pump 82 may be maintained in the turn-off state while the beverage is dispensed. When the beverage is completely dispensed, the air pump 82 may be driven for next beverage dispensing and then stopped.

Thus, when the beverage is completely made, he beverage maker may dispense the beverage within the fermentation container 12 to the beverage dispensing channel module 6 in the state in which the fermentation container 1 is disposed within the fermentation module 1 without withdrawing the fermentation container 12 to the outside of the fermentation module 1. Such configuration makes the user's experience more convenient.

The air controller 15 may include a separate air supply pump with respect to the air injector 8. In this case, the air supply channel 154 may be coupled to the air supply pump, but may not be coupled to the first main channel 41. However, the injection of the air into the fermentation container 12 by the air pump 82 and the supplying of the air into the space between the outer wall of the fermentation container 12 and the inner surface of the fermentation tank 101 may be combined with each other to realize a compact product and reduce a manufacturing cost.

The exhaust channel 157 may function as an air exhaust passage, through which the air between the outer wall of the fermentation container 12 and the inner surface of the fermentation tank 101 is exhausted to the outside, together with a portion of the air supply channel 154.

The exhaust channel 157 may be disposed outside the fermentation module 1. The exhaust channel 157 may be connected to a portion of the air supply channel 154, which is disposed outside the fermentation tank 101.

The air supply channel 154 may include a first channel connected between a connecting portion 157A connected to the first main channel 41 and the exhaust channel 157 and a second channel connected between the connecting portion 154A connected to the exhaust channel 157 and the air supply channel connecting portion 117. The first channel may be an air supply channel for guiding the air pumped by the air pump 82 to the second channel. Also, the second channel may be an air supply and exhaust-combined channel for supplying the air passing through the air supply channel into the space between the inner surface of the fermentation tank 101 and the outer wall of the fermentation container 12 or guiding the air discharged from the space between the inner surface of the fermentation tank 101 and the outer wall of the fermentation container 12 to the connecting channel 157.

The exhaust channel 157 may be coupled to the exhaust valve 156 for opening and closing the exhaust channel 157.

The exhaust valve 156 may be opened so that the air between the fermentation container 12 and the fermentation tank 101 is exhausted to the outside when the fermentation container 12 is expanded while the beverage is made. The exhaust valve 156 may be controlled to be opened (open state) when the water is supplied by the water supply module 5. The exhaust valve 156 may be controlled to be opened (open state) when the air is injected by the air injection channel module 8.

The exhaust valve 156 may be opened (open state) so that the air between the outer wall of the fermentation container and the inner surface of the fermentation tank 101 is exhausted when the beverage within the fermentation container 12 is completely dispensed. The user may then remove the fermentation container from the fermentation tank 101 when the beverage is completely dispensed. This is done for safety because accidents may occur when the inside of the fermentation tank 101 is maintained at a high pressure. The exhaust valve 156 may be controlled to be opened (open state) when the beverage within the fermentation container 12 is completely dispensed.

The air controller 15 may further include an air supply valve 159 that is configured to restrict the air pumped by the air pump 82 and supplied between the fermentation container 12 and the fermentation tank 101.

The air supply valve 159 may be installed in the air supply channel 154. In more detail, the air supply valve 159 may be installed between the connecting portion 154A of the first main channel 41 and the connecting portion 157A of the exhaust channel 157 in the air supply channel 154.

Hereinafter, the sub channel 91 will be described in detail according to an exemplary embodiment.

The sub channel 91 may connect the water supply module 5 to the beverage dispenser 6. In more detail, the sub channel 91 may have one end 91A connected to the water supply channel 55B and the other end 91B connected to the beverage dispensing channel 61.

The sub channel 91 may be connected between the water supply pump 52 and the water supply heater 53 with respect to the water supply channel 55B.

Also, the sub channel 91 may be connected to the connecting portion 61A of the second main channel 42 and the beverage dispensing valve 64 with respect to the beverage dispensing channel 61.

The water supplied by the water supply pump 52 and the air pumped by the air pump 82 may be guided to the beverage dispensing channel 61 through the sub channel 91 and then be dispensed to the dispenser 62. Thus, the residual water or the beverage remaining in the beverage dispenser 6 may be removed.

A sub valve 92 for opening and closing the sub channel 91 may be installed in the sub channel 91.

The sub valve 92 may be opened (open state) when the beverage is dispensed, or when a cleaning operation is performed to open the sub channel 91.

Also, a sub check valve 93 for preventing the beverage of the beverage dispensing channel 61 from flowing back to the water supply module 5 may be installed in the sub channel 91. The sub check valve 93 may be disposed between the sub valve 92 and the beverage dispensing channel 61 with respect to the sub channel 91.

The sub channel 91 may function as a residual water removing channel of the water supply module 5. For example, when the air pump 82 is turned on (on state) in the state in which the air supply valve 159, the bypass valve 35, and the ingredient supply valve 310 are closed (off state), the sub valve 92 is opened, and the air injected into the air injection channel 81 may pass through the water supply heater 53 to flow to the sub channel 91. Then, the air may pass through the sub valve 92 to flow to the beverage dispensing channel 61 and then be dispensed to the dispenser 62. In this process, the air may be dispensed together with the water supply module 5, more particularly, the residual water remaining the water supply heater 53 and the water supply channel 55B so that residual water is removed.

The sub channel 91 may also function as a cleaning channel.

The main channel 41 and 42 of FIG. 2 may be constituted by successively connecting a plurality of members through which the beverage ingredients, such as the water, are capable of passing. The gas discharge channel 71 of FIG. 2 may be constituted by successively connecting a plurality of members through which the fluid is capable of passing.

The beverage maker may further include a hinge shaft, a pair of hinge shaft supports 113 and 114, and a cover 9 for covering fitting T5 and T6 and the outer tube T3 and T4. The cover 9 may be disposed behind the fermentation module 1.

The hinge shaft 160, the pair of hinge shaft supports 113 and 114, the fitting T5 and T6, and the outer tube T3 and T4 may be accommodated between the fermentation module 1 and the cover 9 and protected by the fermentation module and the cover 9.

Figure 3:
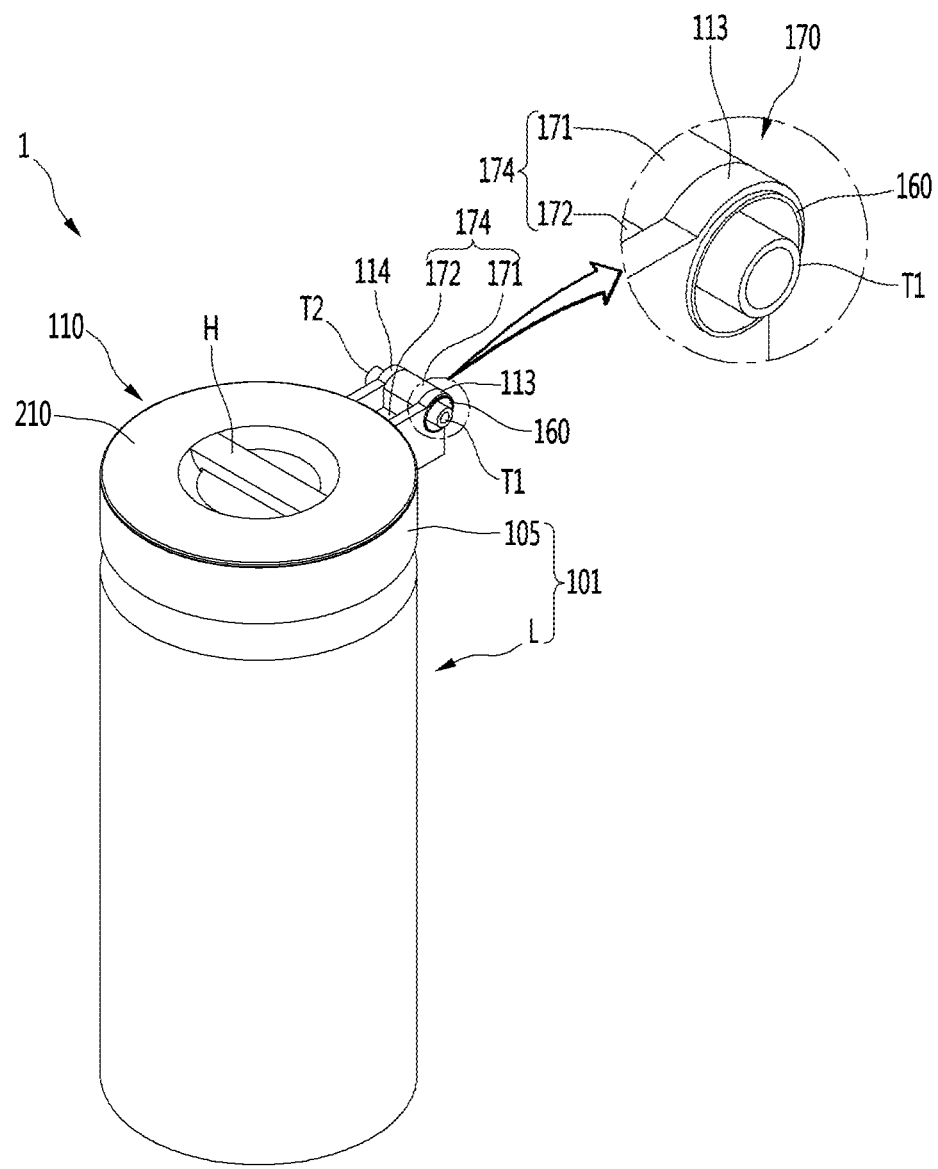
FIG. 3 is a perspective view of a fermentation module according to an embodiment of the present invention.
Figure 4:
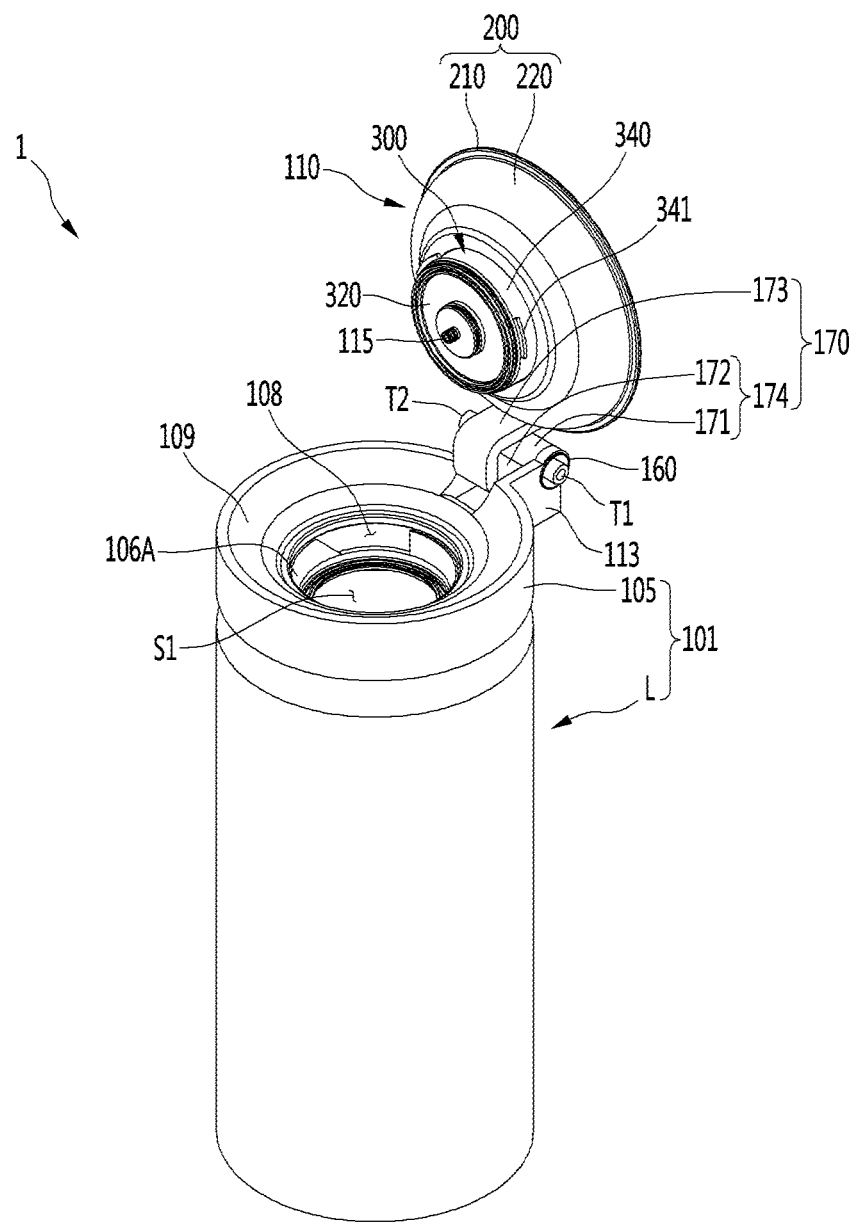
FIG. 4 is a perspective view when a fermentation lid of FIG. 3 is opened.
Figure 5:
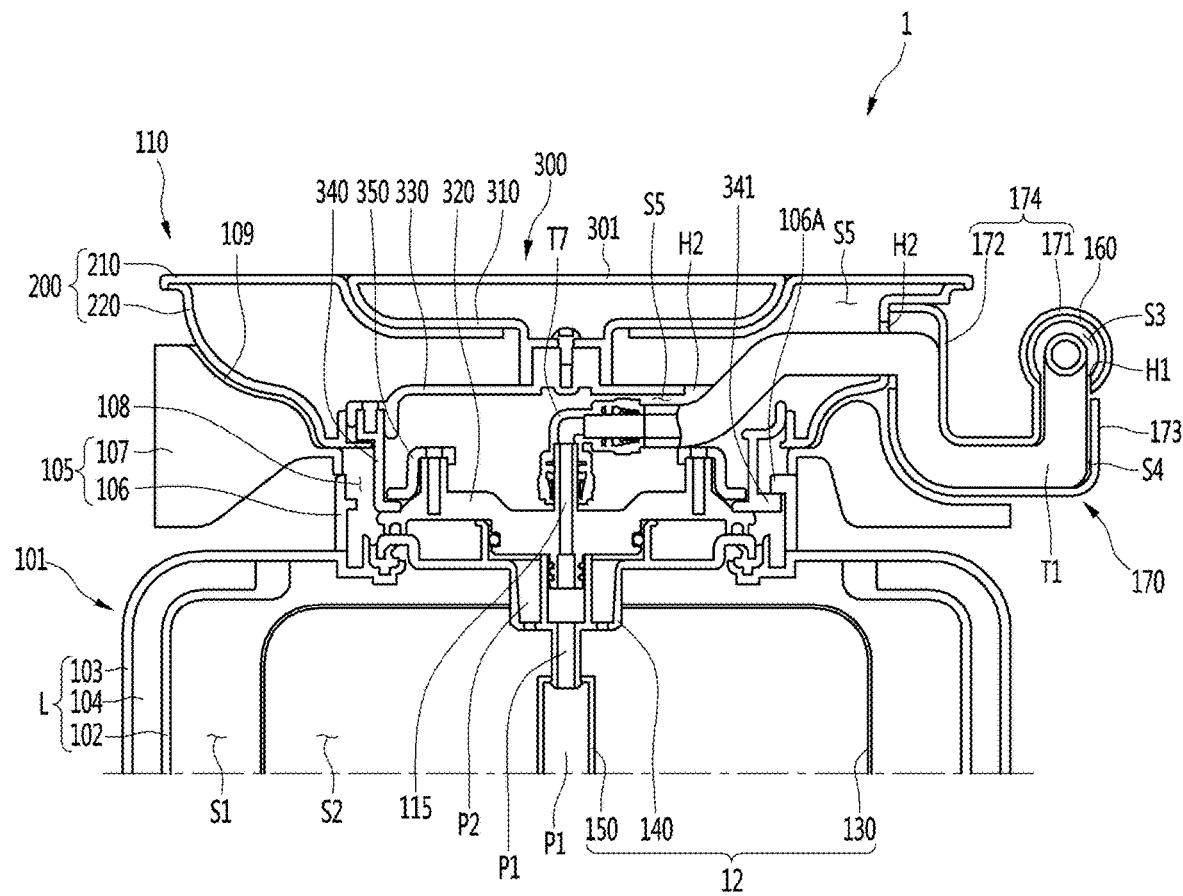
FIG. 5 is a cross-sectional view illustrating a state in which a tube is connected to the fermentation lid according to an embodiment of the present invention.
Figure 6:
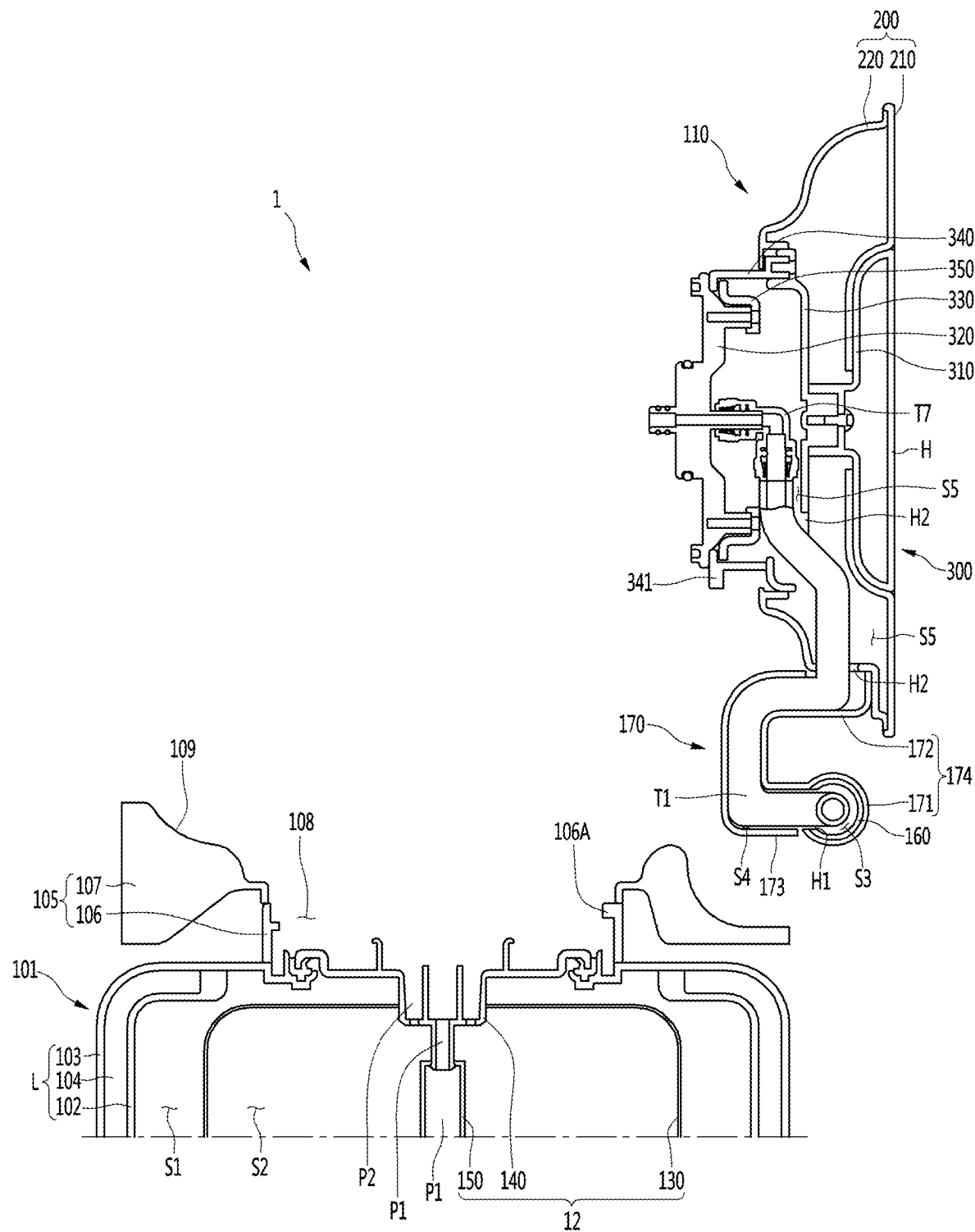
FIG. 6 is a cross-sectional view when the fermentation lid of FIG. 5 is opened.
Figure 7:
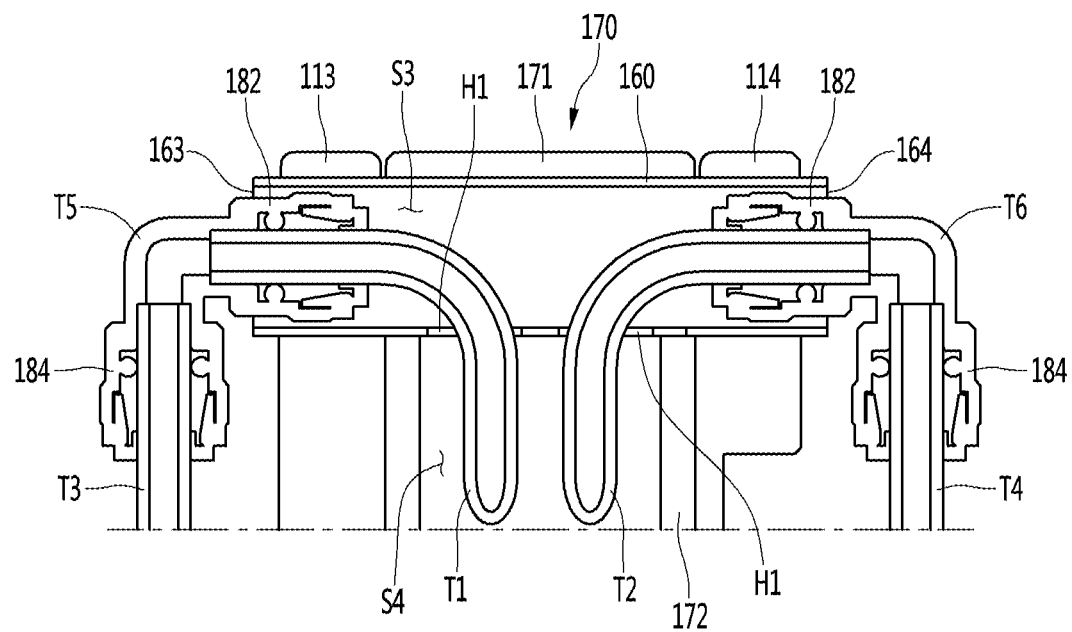
FIG. 7 is a cross-sectional view illustrating a state in which a fermentation tank and a hinge shaft are connected to each other according to an embodiment of the present invention.
Figure 8:
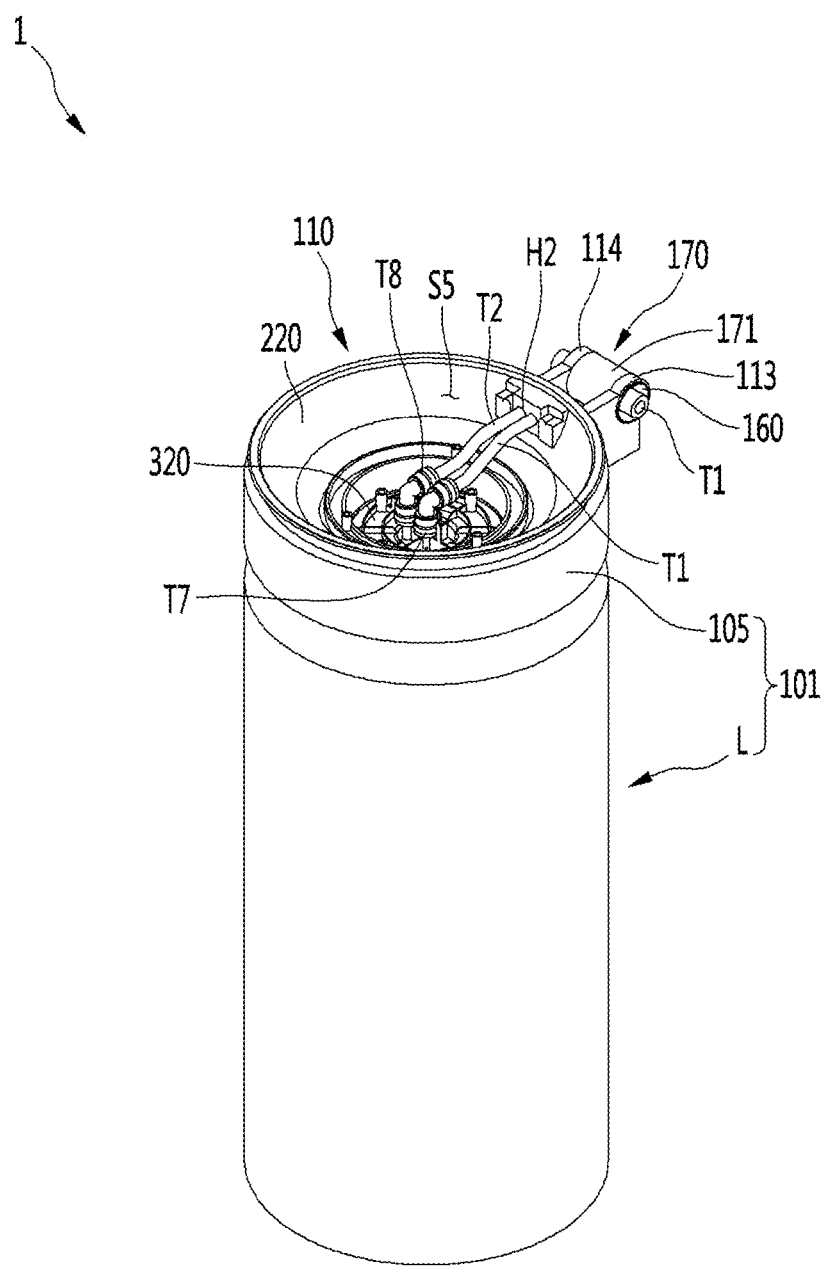
FIG. 8 is a perspective view illustrating the inside of the fermentation lid according to an embodiment of the present invention.
Figure 9:
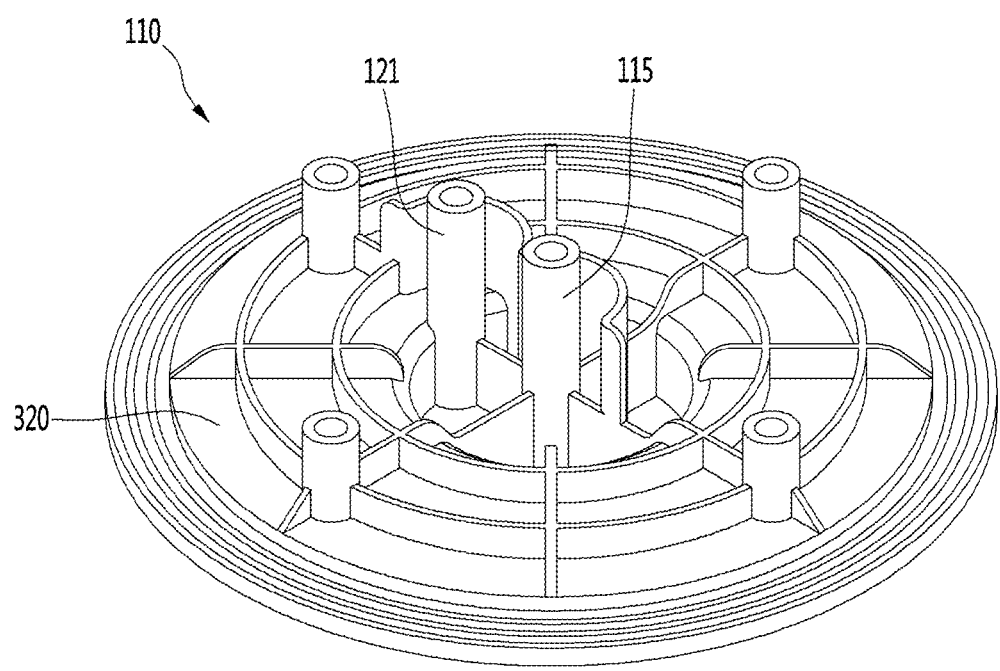
FIG. 9 is a perspective view of a lid channel body of FIG. 8.
Figure 10:
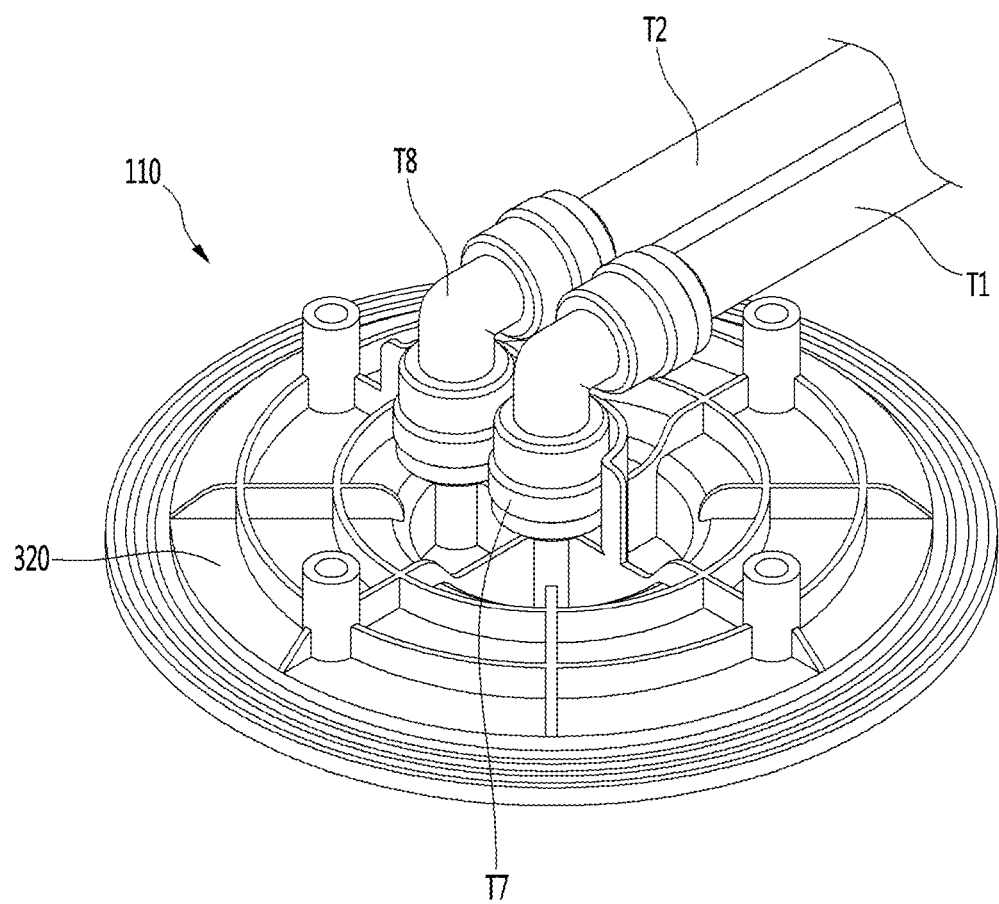
FIG. 10 is a perspective view when the tube is connected to a lid channel body of FIG. 9.

FIG. 3 is a perspective view of the fermentation module according to an embodiment of the present invention. FIG. 4 is a perspective view when the fermentation lid of FIG. 3 is opened. FIG. 5 is a cross-sectional view illustrating a state in which the tube is connected to the fermentation lid according to an embodiment of the present invention. FIG. 6 is a cross-sectional view when the fermentation lid of FIG. 5 is opened (open state). FIG. 7 is a cross-sectional view illustrating a state in which the fermentation tank and the hinge shaft are connected to each other according to an embodiment of the present invention. FIG. 8 is a perspective view illustrating the inside of the fermentation lid according to an embodiment of the present invention. FIG. 9 is a perspective view of a lid channel body of FIG. 8. FIG. 10 is a perspective view when the tube is connected to a lid channel body of FIG. 9.

The fermentation tank 101 may include a lower fermentation tank L having a space S1 and a lid connector 105 disposed on the lower fermentation tank L.

The lower fermentation tank L may include an inner fermentation tank 102, an outer case 103, and an insulation portion 104.

An opening 108 may be formed in the lid connector 105. The opening 108 may communicate with the space S1 of the lower fermentation tank L and be defined with a size a less than that of the space S1 in an upper portion of the space S1. The opening 108 may have a size that allows the fermentation container 12 to be accessible to a user.

A lid seating groove 109 in which the fermentation lid 110 is disposed may be formed in a top surface of the lid connector 105.

The lid connector 105 may include a neck body 106 having the opening 108 and a top body 107 on which the fermentation lid 110 is seated or disposed.

The neck body 106 may be disposed on the lower fermentation tank L. The neck body 106 may be smaller than each of the lower fermentation tank L and the top body 107.

A lid seating groove 109 in which the fermentation lid 110 is seated or disposed may be formed in the top body 107. The top body 107 may be disposed on the neck body 106. The top body 107 may be smaller than the neck body 106. The top body 107 may be integrated with the neck body 106. Alternatively, the top body 107 may be provided as a separate constituent with respect to the neck body 106 and coupled to the neck body 106 so that the top body 107 is disposed on the neck body 107.

The fermentation lid 110 may be rotatably coupled to the lid connector 105.

At least a portion of the fermentation lid 110 may be disposed inside the opening 108 (inserted into the opening 108) of the lid connector 105, and the fermentation lid 110 may function to seal the opening 108 of the lid connector 105.

An upper portion of the fermentation lid 110 may be larger than that of the opening 108, and an upper portion of the fermentation lid 110 may cover the opening 108. A lower portion of the fermentation lid 110 may be smaller than that of the opening 108 and be inserted to be accommodated in the opening 108.

Hereinafter, the fermentation container 12 will be described in detail with reference to FIGS. 5 and 6 according to an embodiment of the present invention.

A container main channel P1 through which the fluid passes may be provided in the fermentation container 12. The fluid may flow into and out of the fermentation container 12 through the container main channel P1.

The container main channel P2 may communicate with the fermentation space S2. The ingredients, such as gas, air, water, and additives may be introduced into the fermentation space S2 through the container main channel P1. Thus, the container main channel P1 may be an ingredient putting passage through which the beverage ingredients for making the beverage are supplied into the fermentation space S2.

The beverage made in the fermentation space S2 may be dispensed to the outside of the fermentation container 12 through the container main channel P1. The container main channel P1 may be a beverage dispensing passage through which the beverage made in the fermentation space S2 is disposed to the outside of the fermentation container 12.

A container sub channel P2 for discharging the gas of the fermentation space S2 to the outside of the fermentation container 12 may be provided in the fermentation container 12. The beverage ingredient within the fermentation space S2 may generate a gas, such as carbon dioxide. The gas may be disposed to the outside of the fermentation container 12 through the container sub channel P2.

The fermentation container 12 may be provided as an assembly of a plurality of members. The fermentation container 12 may include a flexible container 130 and a container body 140.

The flexible container 130 may be expanded or compressed during the beverage making operation. The fermentation space S2 may be defined inside the flexible container 130.

Before the beverage is made, the fermentation space S2 may be an accommodating space accommodating the beverage ingredients. When the beverage is being made by the beverage maker, the fermentation space S may be a space in which the ingredients undergo fermentation.

The flexible container 130 may be coupled to the container body 140. The flexible container 130 may be expanded or compressed in a state of being bonded to the container body 140.

In a non-limiting example, the flexible container 130 may include a pair of films. A beer making space S2 may be defined between the pair of films.

Edges of the pair of films may be bonded to each other, and the flexible container 130 may be expanded and contracted.

One of the pair of films may be a bonded film bonded to the container body 140, and the other film may be a non-bonded film that is not bonded to the container body 140.

The flexible container 130 may be expanded while the beverage is made in the space S1 of the fermentation tank 101 by the fermentation container 12.

The flexible fermentation container 130 may have a compact shape before the container 12 is used for the beverage maker. The fermentation container 12 may be expanded during the beverage maker process.

In the flexible container 130, an upper film, which is disposed at a relatively upper side, of the pair of films may be bonded to the container body 140, and a lower film, which is disposed at a relatively lower side, of the pair of films may not be bonded to the container body 140.

The container body 140 may be disposed/seated on or coupled to the container support portion provided in the fermentation module 1. The container main channel P1 and the container sub channel P2 may be provided in the container body 140.

The container body 140 may be provided as an assembly of a plurality of members. The container body 140 may include a channel body in which the container main channel P1 and the container channel P2 are provided and a bonded body connected to the channel body and bonded to the flexible container 130.

The fermentation container 12 may further include a container tube 150. The container tube 150 may be detachably coupled to a lower portion of the container body 140. The container tube 150 may extend along a lengthwise direction up to a lower portion of the inside of the flexible container 130. A lower end of the container tube 150 is an end thereof that is located closer to the flexible container 130 of the lower end of the flexible container 130 and the container body 140. The container main channel P1 communicating with the fermentation space S2 of may be provided in the container tube 150.

As illustrated in FIGS. 5 to 8, the beverage maker may further include a hinge shaft 160 for rotatably coupling the fermentation lid 110 to the fermentation tank 101.

The fermentation tank 101 may have the space S1 therein and rotatably support the hinge shaft 160. As illustrated in FIGS. 7 and 8, the fermentation tank 101 may further include a pair of hinge shaft supports 113 and 114 for rotatably supporting the hinge shaft 160. The hinge shaft supports 113 and 114 may be disposed on the fermentation tank 101. The hinge shaft supports 113 and 114 may protrude from the lid connector 105. The pair of hinge shaft supports 113 and 114 may be disposed adjacent to each other in a horizontal direction.

As illustrated in FIGS. 3 to 8, the fermentation lid 110 may be coupled to the hinge shaft 160 and the bracket 170 to be rotatable about the hinge shaft 160, thereby opening and closing the space S1.

As illustrated in FIGS. 5 to 8, the beverage maker may include at least one tube T1 and T2 through which the fluid passes and which is connected to the fermentation lid 110. The at least one tube T1 and T2 may be directly connected to the fermentation lid 110 or indirectly connected to the fermentation lid 110 through inner fitting T7 and T8 as illustrated in FIGS. 8 and 10. The inner fitting T7 and T8 may be tube connector connecting the fermentation lid 110 to the at least one tube T1 and T2 between the fermentation lid 110 and the at least one tube T1 and T2.

Hereinafter, embodiments in which the at least one tube T1 and T2 is directly connected to the fermentation lid 110 and the embodiments in which the at least one tube T1 and T2 is connected to the fermentation lid 110 through the inner fitting T7 and T8 may be understood as the case in which the at least one tube T1 and T2 is connected to the fermentation lid 110.

The at least one tube T1 and T2 may extend to the fermentation lid 110 along the hinge shaft 160 and the bracket 170.

The at least one tube T1 and T2 may be accommodated in at least one of the hinge shaft 160 and the bracket 170. In this case, when viewed from the outside of the beverage maker, the at least one tube T1 and T2 may be generally hidden from sight. That is, the at least one tube T1 and T2 may be hidden and protected by at least one of the hinge shaft 160 and the bracket 170.

When the at least one tube T1 and T2 may be accommodated in the hinge shaft 160, a hinge shaft space S3 into which the at least one tube T1 and T2 may be accommodated may be formed in the hinge shaft 160 as illustrated in FIGS. 5 to 7. Also, at least one hinge shaft hole H1 through which the at least one tube T1 and T2 extends to the outside of the hinge shaft 160 may be formed in the hinge shaft 160.

The hinge shaft 160 may have a hollow shape. A portion of the at least one tube T1 and T2 may be accommodated in the hinge shaft 16.

The hinge shaft hole H1 may be opened in a radial direction of the hinge shaft 160. In the state in which a portion of the at least one tube T1 and T2 is accommodated in the hinge shaft space S3, the at least one tube T1 and T2 may extend to the outside of the hinge shaft 160 through the hinge shaft hole H1.

When the at least one tube T1 and T2 is accommodated in the bracket 170, a bracket space S4 (also referred to as a "bracket accommodating space") into which the at least one tube T1 and T2 are accommodated may be formed in the bracket 170, such as illustrated in FIGS. 5 to 7.

As illustrated in FIGS. 5 to 7, the at least one tube T1 and T2 may be accommodated into the hinge shaft 160 and the bracket 170, respectively. In this case, the at least one tube T1 and T2 may be minimally exposed and protected by the hinge shaft 160 and the bracket 170.

When the at least one tube T1 and T2 is respectively accommodated in the hinge shaft 160 and the bracket 170, the hinge shaft hole H1 may be opened to the bracket space S4. The hinge shaft hole H1 may allow the hinge shaft space S3 to communicate with the bracket space S4. The at least one tube T1 and T2 may extend to the bracket space S4 through the hinge hole H1 in the hinge shaft accommodating space S3.

The bracket 170 may be perpendicularly connected to hinge shaft 160. The at least one tube T1 and T2 may be bent so that a portion accommodated in the hinge shaft space S2 and a portion accommodated in the bracket space S4 are perpendicular to each other.

As illustrated in FIGS. 5 and 6, a fermentation lid hole H2 which communicates with the bracket space S4 and through which the at least one tube T1 and T2 passes may be formed in the fermentation lid 110. An inner space S5 into which the at least one tube T1 and T2 is accommodated may be formed in the fermentation lid 110. The fermentation lid hole H1 may allow the bracket space S4 to communicate with the inner space S5. The at least one tube T1 and T2 may extend to the inner space S5 through the fermentation lid hole H2 in the bracket space S4.

As illustrated in FIG. 8, the portion of the at least one tube T1 and T2, which is accommodated in the inner space S5 may be coupled to the fermentation lid 110.

As described above, when the at least one tube T1 and T2 is disposed in the hinge shaft 160, the bracket 170, and the fermentation lid 110, a portion from the portion disposed in the hinge shaft 160 to the portion disposed in the fermentation lid 110 may be minimally visible from the outside and protected by the hinge shaft 160, the bracket 170, and the fermentation lid 110.

A plurality of tubes T1 and T2 may be accommodated together in the hinge shaft space S3, the bracket space S4, and the inner space S5. One of the plurality of tubes T1 and T2 may define a portion 42 of the main channel 41 and 42 of FIG. 2, and the other tube may be define a portion of the gas discharge channel 71 of FIG. 2.

The main channel 41 and 42 of FIG. 2 may include one T1 of the plurality of tubes T1 and T2 accommodated in the fermentation module 1. The one T1 of the plurality of tubes T1 and T2 accommodated in the fermentation module 1 may be a main tube T1 coupled to the fermentation lid 110.

The main channel 41 and 42 may further include a main outer tube T3 disposed outside of the fermentation tank 101.

Also, the main channel 41 and 42 may further include a main fitting T5 to which each of the one T1 of the plurality of the plurality of tubes T1 and T2 and the main outer tube T3 is coupled.

The gas discharge channel 71 of FIG. 2 may include the other one T2 of the plurality of tubes T1 and T2 accommodated in the fermentation module 1. The other one T2 of the plurality of tubes T1 and T2 accommodated in the fermentation module 1 may be a sub tube T2 connected to the fermentation lid 110.

Also, the gas discharge channel 71 may further include a sub outer tube T4 disposed outside of the fermentation tank 101. Also, the gas discharge channel 71 may further include a sub fitting T6 to which each of the other one T2 of the plurality of the plurality of tubes T1 and T2 and the sub outer tube T4 is coupled.

The common constituents of the main tube T1 and the sub tube T2 are referred to herein as the tubes T1 and T2, and different constituents of the main tube T1 and the sub tube T2 are referred to herein as the main tube T1 and the sub tube T2.

The bracket 170 may include a hinge shaft fixing portion 171 and elongation portion 172 and 173.

Referring to FIGS. 5 to 7, the hinge fixing portion 171 may be fixed to the hinge shaft 160. The hinge shaft fixing portion 171 may have a length that is less than a distance between the pair of hinge shaft supports 113 and 114. The hinge shaft fixing portion 171 may be disposed between the pair of hinge shaft supports 113 and 114. The hinge shaft fixing portion 171 may be fixed to the hinge shaft 160 to open the hinge shaft hole H1. The hinge shaft fixing portion 171 may surround a portion of the hinge shaft 160. The hinge shaft fixing portion 171 may have a cross-section in an arc-like shape, but is not limited thereto.

Referring to FIGS. 5 and 6, the elongation portion 172 and 173 may be elongated from the hinge shaft fixing portion 171 and be coupled to the fermentation lid 110. The bracket space S4 may be defined in the elongation portion 172 and 173.

Each of the elongation portion 172 and 173 and the bracket space S4 may have at least one bent portion.

The elongation portion 172 and 173 may include a first elongation portion 172 integrated with the hinge shaft fixing portion 171 and a second elongation portion 173 coupled to the first elongation portion 172. The bracket space S4 may be defined between the first extension portion 172 and the second extension portion 173.

The bracket 170 may be provided as an assembly of a plurality of members and may include a main connector 174 and a tube cover.

The main connector 174 may include the hinge shaft fixing portion 171 fixed to the hinge shaft 160, and the main connector 174 may include the hinge shaft fixing portion 171 and the first elongation portion 172.

The tube cover may surround the tubes T1 and T2 together with the main connector 174. The tube cover may be the second elongation portion 173. Thus, hereinafter, the tube cover and the second elongation portion 173 may be denoted by the same reference numeral 173.

The bracket space S4 may be defined between the main connector 174 and the tube cover 173, and the main connector 174 and the tube cover 174 may protect the tubes T1 and T2 while exposing the tubes T1 and T2 from the outside of the beverage maker.

The hinge shaft 160 may have opened ends 163 and 164. The hinge shaft 160 may have both opened ends. Also, the tubes T1 and T2 may have one end extending to the outside of the hinge shaft 160 through the end of the hinge shaft 160.

Referring to FIG. 7, the fitting T5 and T6 may be coupled to the tubes T1 and T2, and the outer tubes T3 and T4 may be coupled to the fitting T5 and T6.

The fitting T5 and T6 may include a tube connecting portion 182 connected to the tubes T1 and T2 and an outer tube connecting portion 184 to which each of the outer tubes T3 and T4 is connected.

The tube connecting portion 182 may be smaller than that of the hinge shaft space S3.

At least a portion of the tube connecting portion 182 may be disposed between the tubes T1 and T2 and the hinge shaft 160.

The outer tube connecting portion 184 may be connected to the outer tubes T3 and T4 at the outside of the hinge shaft 160.

One T1 of the plurality of tubes T1 and T2 may extend outside of the hinge shaft 160 through one end 163 of the hinge shaft 160.

The other one T2 of the plurality of tubes T1 and T2 may extend through the other end 164 of the hinge shaft 160 in a direction opposite to the one T1 of the plurality of tubes T1 and T2.

The main fitting T5 to which the main outer tube T3 is connected may be connected to the one T1 of the plurality of tubes T1 and T2. The main tube T1 may be connected to the main outer tube T3 through the main fitting T5.

The sub fitting T6 to which the sub outer tube T4 is connected may be connected to the other one T2 of the plurality of tubes T1 and T2. The sub tube T2 may be connected to the sub outer tube T4 through the sub fitting T6.

The common constituents of the main fitting T5 and the sub fitting T6 are referred to herein as the fitting T5 and T6, and different constituents of the main fitting T5 and the sub fitting T6 are referred to herein as the main fitting T5 and the sub fitting T6.

The main fitting T5 and the sub fitting T6 may be spaced apart from each other. The main fitting T5 and the sub fitting T6 may be horizontally spaced apart from each other with the plurality of tubes T1 and T2 therebetween.

The tubes T1 and T2 according to this embodiment may be entirely hidden by the fitting T5 and t6, the hinge shaft 160, the bracket 170, and the fermentation lid 110. Thus, the tubes T1 and T2 may be maintained in the clean state event though the beverage maker is used for a long time.

Hereinafter, the fermentation lid 110 will be described in detail according to an exemplary embodiment.

At least one tube connecting portion to which the tubes T1 and T2 are connected may be disposed on the fermentation lid 110. The tube connecting portion may be a main channel connecting portion 115 and the gas discharge channel connecting portion 121.

As illustrated in FIG. 5, the main tube T1 and the container main channel P1 may communicate with each other through the main channel connecting portion 115. The container main channel P1, the main channel connecting portion 115, and the main tube T1 may together constitute a passage for guiding the fluid.

The beverage ingredients such as water, additives, or gas (such as air) may be introduced from the main tube T1 into the main channel connecting portion 115 and then pass through the channel connecting portion 115 to flow to the main channel P1 so as to be supplied from the container main channel P1 to the fermentation container 12.

The beverage made in the fermentation container 12 may flow to the main channel connecting portion 115 through the container main channel P1 within the fermentation container 12 and then pass through the main channel connecting portion 115 and be guided to the main tube T1.

The main channel connecting portion 115 may be connected to the main tube T1 and selectively communicate with the main channel P1 through switching of the fermentation lid 110.

In the state in which the fermentation container 12 is accommodated in the space S1 of the fermentation tank 101, when the fermentation lid 110 is closed, the main channel P1 may be connected to the main channel connecting portion 115.

On the other hand, in the state in which the main channel connecting portion 115 communicates with the container main channel P1, when the fermentation lid 110 is opened, the main channel connecting portion 115 may be separated from the container main channel P1 as illustrated in FIG. 6.

The gas discharge channel connecting portion 121 may be configured so that the sub tube T2 and the container sub channel P2 communicate with each other. The container sub channel P2, the gas discharge channel connecting portion 121, and the sub tube T2 may provide a passage for guiding the gas.

The gas within the fermentation container 12 may be discharged to the sub tube T2 after passing through the sub channel P2 and the gas discharge channel connecting portion 121.

The gas discharge channel connecting portion 121 may communicate with the sub channel P2. In the state in which the fermentation container 12 is accommodated in the space S1 of the fermentation tank 101, when the fermentation lid 110 is closed, the gas discharge channel connecting portion 121 may communicate with the sub channel P2. On the other hand, in the gas discharge channel connecting portion 121 communicates with the container sub channel P2, when the fermentation lid 110 is opened, the gas discharge channel connecting portion 121 may be separated from the sub channel P2.

The gas discharge channel connecting portion 121 may be connected to the sub tube T2 and selectively communicate with the sub channel P2 through the switching of the fermentation lid 110.

In the state in which the fermentation container 12 is accommodated in the space S1 of the fermentation tank 101, when the fermentation lid 110 is closed, the gas discharge channel connecting portion 121 may communicate with the sub channel P2.

On the other hand, in the state in which the gas discharge channel connecting portion 121 communicates with the sub channel P2, when the fermentation lid 110 is opened, the gas discharge channel connecting portion 121 may be separated from the sub channel P2.

The fermentation lid 110 may be provided as an assembly of a plurality of components.

The fermentation lid 110 may include an outer lid 200 and an inner lid 300 that is rotatably and elevatably disposed on the outer lid 200.

The outer lid 200 may include an upper outer lid 210 and a lower outer lid 220 coupled to the upper outer lid 201.

A fermentation lid hole H2 through which the plurality of tubes T1 and T2 pass may be formed in the outer lid 200. The fermentation lid hole H2 may be defined in the outer led 200 to be opened in the horizontal direction. The fermentation lid hole H2 may be formed in the lower outer lid 220. The inner space S5 in which a portion of the tubes T and T2 is accommodated may be defined in the lower outer lid 220.

The fermentation lid hole H2 defined in the outer lid 200 may be formed at a height that is above that of the lid channel body 320. The fermentation lid hole H2 may be formed at a height that is above that of an upper portion of the tube connecting portion disposed on the lid channel body 320. The fermentation lid hole H2 may be located above the upper end of the main tube connecting portion 115 and an upper end of the gas discharge channel connecting portion 121.

An inner lid guide for guiding the elevation and the rotation of the inner lid 300 may be disposed on the outer lid 200. The inner lid guide may be disposed to surround an outer circumference of the inner lid 300 and have a predetermined length in the vertical direction. The inner lid guide may have a hollow shape that is opened in the vertical direction.

The inner lid 300 may be elevated along the inner lid guide and rotate along the inner lid guide with respect to a vertical central axis.

The inner lid 300 may be rotatably disposed with respect to the outer lid 200. The inner lid 300 may be rotatable in a clockwise direction or a counterclockwise direction with respect to the vertical axis. The inner lid 300 may rotate in one direction of the clockwise direction and the counterclockwise direction so as to be restricted by the fermentation tank 101 and rotate in the other direction of the clockwise direction and the counterclockwise direction so as to be released from the restriction of the fermentation tank 101.

A protrusion 34 for restricting the inner lid 300 to the fermentation tank 101 may protrude from one of the inner lid 300 and the fermentation tank 101, and a protrusion guide 106A slidably guiding the protrusion 341 in the rotation direction of the inner lid 300 may be disposed on the other one of the inner lid 300 and the fermentation tank 101.

The protrusion guide 106A may include a sliding guide guiding the protrusion 341 in the rotation direction of the inner lid 300 and an entrance guide through which the protrusion 341 passes to be accessible to the sliding guide.

The sliding guide may be lengthily disposed in a circumferential direction along an outer circumference of the inner lid 300 or an inner circumference of the fermentation tank 101.

A stopper on which the protrusion 341 may be hooked may be disposed on the sliding guide. The stopper may be disposed at an opposite side of the entrance guide of both ends in a longitudinal direction of the sliding guide.

The entrance guide may be disposed on one side of the sliding guide in a vertical direction or in an inclined direction.

The protrusion 341 may be inserted into the protrusion guide 106A at an upper or lower side of the protrusion guide 106A and be guided along the protrusion guide 106A. For example, the protrusion 341 may rotate along the protrusion guide 106A and then be hooked with the protrusion guide 106A in an upward or downward direction.

When the protrusion 341 is completely inserted into the protrusion guide 106A, the inner lid 300 may be vertically hooked with the fermentation tank 101. Thus, the inner lid 300 may be hooked with the fermentation tank 101 and restricted in arbitrary rotation upward.

When the protrusion 341 is disposed on the inner lid 300, the protrusion guide 106A may be disposed on the fermentation tank 101. In this case, the protrusion guide 106A may be disposed on an inner circumferential surface of the fermentation tank 101. In a non-limiting example, the protrusion guide 106 may have a shape that is recessed or protrudes from the inner circumference of the fermentation tank 101.

The protrusion guide 106 may be disposed in the opening 108 and disposed on the inner circumference of the lid connector 105.

The inner lid 300 may be provided as an assembly of a plurality of members. The inner lid 300 may include a handle body 310.

A handle H that is configured to be held by a user to rotate may be provided on the handle body 310. The handle H may be disposed on an upper portion of the handle body 310.

The handle body 310 may include a connecting portion connected to connecting bodies 330 and 340 through a coupling member, such as a hook or a screw. The handle body 310 may be rotatable together with the connecting bodies 330 and 340 and be elevated together with the connecting bodies 330 and 340 in the state of being connected to the connecting bodies 330 and 340.

The fermentation lid 110 may include the lid channel body 320. The main channel connecting portion 115 and the gas discharge channel connecting portion 121 may be disposed on the lid channel body 320.

The lid channel body 320 may be supported by the inner lid 300, and when the inner lid 300 is elevated, the lid channel body 320 may be elevated together with the inner lid 300.

The lid channel body 320 may be disposed to face the space S1 of the fermentation tank 101 when the fermentation lid 110 is closed.

The main channel connecting portion 115 may be lengthily disposed on the lid channel body 320 in the vertical direction. The upper portion of the main channel connecting portion 115 may protrude upward from the lid channel body 320 and be coupled to the main tube T1 or the inner fitting T7.

The main tube T1 or the inner fitting T7 may be inserted into the inside or outside of the upper portion of the main channel connecting portion 115 and connected to the main channel connecting portion 115.

The lower portion of the main channel connecting portion 115 may protrude from the lid channel body 320 in a downward direction. When the fermentation lid 110 is closed, the container main channel connecting portion 115 may be inserted into the container main channel P2 to communicate with the container main channel P2.

When the user opens the fermentation lid 110, the lower portion of the main channel connecting portion 115 may be separated from the inside of the container main channel P1 to an upper side of the container main channel P1 and thus be separated from the container main channel P1.

The main channel connecting portion 115 may be lengthily disposed from an upper end to a lower end thereof.

The gas discharge channel connecting portion 121 may be lengthily disposed on the lid channel body 320 in the vertical direction. The upper portion of the gas discharge channel connecting portion 121 may protrude in an upward direction from the lid channel body 320 and be connected to the sub tube T2 or the inner fitting T8.

The sub tube T2 or the inner fitting T8 may be inserted into the inside or outside of the upper portion of the gas discharge channel connecting portion 121 and connected to the gas discharge channel connecting portion 121.

As described above, the lid channel body 320 may be directly supported on the handle body 310 or indirectly supported on the handle body 310 through connecting bodies 330 and 340.

The inner lid 300 may further conclude a connecting body 330 connected to the handle body 310 to support the tube connecting bodies 320 and 340.

The connecting bodies 330 and 340 may support the lid channel 320 so that the lid channel body 320 is disposed below the handle body 310.

The lid channel body 320 may be supported on the connecting bodies 330 and 340 so as to be vertically spaced apart from the handle body 310.

The inner space S3 into which the tubes T1 and T are accommodated may be defined in each of the connecting bodies 330 and 340. The inner space S5 into which the tubes T1 and T2 are accommodated may be defined between the connecting bodies 330 and 340 and the lid channel body 320.

The fermentation lid hole H2 through which the tubes T1 and T2 pass may be formed in each of the connecting bodies 330 and 340.

Each of the connecting bodies 330 and 340 may be provided as an assembly of a plurality of members. The connecting bodies 330 and 340 may include an upper connecting body 330 and a hollow connecting body 340.

The upper connecting body 340 may be connected to the handle body 310 so as to be vertically spaced from the lid channel body 320. The upper connecting body 330 may be connected to the handle body 310 through a hook portion, such as a hook, or a coupling member such as a screw. The connection means is not limited to the hook or screw structures.

The inner space S5 may be defined between the upper connecting body 330 and the lid channel body 320. The fermentation lid hole H2 may be formed in the upper connecting body 330.

The hollow connecting body 340 may have the inner space S5 therein, and an upper portion of the hollow connecting body 340 may be fixed to the upper connecting body 330. The hollow connecting body 340 may be connected to the upper connecting body 330 through a hook portion, such as a hook, or a coupling member, such as a screw. The connection means is not limited to the hook or screw structures.

When the handle body 310 rotates, the connecting bodies 330 and 340 may be connected to be rotatable together with the handle body 310. Thus, when the handle body 310 is elevated, the connecting bodies 330 and 340 may be elevated together with the handle body 310. A protrusion 341 for inserting or separating the inner lid 300 into/from the lid connector 105 in a screw type may protrude from the connecting bodies 330 and 340, particularly, the outer circumference of the hollow connecting body 340.

The fermentation lid 110 may further include a holder 350 connected to the lid channel body 320. The holder 350 may be connected to the lid channel body 320 through a hook portion, such as a hook, or a coupling member, such as a screw. The connection means is not limited to the hook or screw structures.

The holder 350 may support the lid channel body 320 on the hollow connectors 330 and 340. A gap into which a support portion of each of the connecting bodies 330 and 340 is rotatably accommodated may be defined between the holder 350 and the lid channel body 320.

The support portion supporting the holder 350 and the lid channel body 320 may be disposed on each of the connecting bodies 330 and 340, particularly, the hollow connecting body 340. The support portion may protrude from the hollow connecting body 340. For example, the support portion may protrude from a lower portion of the hollow connecting body 340 and be rotatably disposed in the gap defined between the holder 350 and the lid channel body 320.

Thus, when the handle body 310 rotates, the holder 350 may not rotate together with the hollow connecting body 340, and the hollow connecting body 340 may rotate along the upper connecting body 330 between the holder 350 and the lid channel body 320.

The tubes T1 and T2 may be connected to the lid channel body 320. When the holder 350 is fixed to the lid channel body 320, the lid channel body 320 and the holder 350 may not rotate together with the upper connecting body 330 and the hollow connecting body 340. The upper connecting body 330 and the hollow connecting body 340 may rotate together with the handle body 310 with respect to the lid channel body 320.

According to this embodiment, the tube may be hidden by the hinge shaft to effectuate an elegant outer appearance, and the hinge shaft may protect the tube to minimize the damage or the contamination of the tube.

Also, since the beverage ingredients are put through the tube, the beverage may be more cleanly made when compared to the case in which the beverage ingredients are put in the state in which the fermentation lid is opened.

Also, the tube extending from the hinge shaft may be hidden and protected by the bracket so as to be minimally visible from the outside when the fermentation lid is opened.

Also, since the hinge shaft and the bracket fix the tube, the movement of the tube may be minimized, and the number of components may be minimized when compared to the case in which the separate fixing member for fixing the tube is installed on the fermentation tank or lid.

Additionally, the rotation shaft may protect the plurality of tubes to protect the plurality of tubes while minimizing the number of components.

Additionally, since the tube connecting portion of the fitting is inserted between the hinge shaft and the tube to hide the tube, the tube may be minimally visible from the outside of the hinge shaft.

The above-disclosed subject matter is to be considered illustrative, and not restrictive, and the appended claims are intended to cover all such modifications, enhancements, and other embodiments, which fall within the scope of the present disclosure.

Thus, the embodiments of the present disclosure are to be considered illustrative, and not restrictive.

Therefore, the scope of the present disclosure is defined not by the detailed description of the invention but by the appended claims, and all differences within the scope will be construed as being included in the present disclosure.

What is claimed is:

1. A beverage maker comprising:
   a hinge shaft having a hinge shaft accommodating space and at least one hinge shaft hole formed therein;
   a fermentation tank having a space formed therein and configured to rotatably support the hinge shaft;
   a fermentation lid coupled to the hinge shaft by a bracket and rotatable about the hinge shaft to open and close the space;
   at least one tube to accommodate a passing fluid,
   wherein the hinge shaft accommodating space is configured to accommodate the at least one tube, and
   the at least one tube extends through the at least one hinge shaft hole to the outside of the hinge shaft accommodating space.

2. The beverage maker of claim 1, wherein the at least one tube extends to the fermentation lid along the hinge shaft and the bracket.

3. The beverage maker of claim 1, wherein the hinge shaft has a hollow shape, and
   the at least one hinge shaft hole is opened to the hinge shaft in a radial direction of the hinge shaft.

4. The beverage maker of claim 1, wherein a bracket accommodating space to accommodate the at least one tube is formed inside the bracket, and
   the at least one tube is covered by the bracket.

5. The beverage maker of claim 4, wherein the at least one hinge shaft hole is open in a direction facing the bracket accommodating space.

6. The beverage maker of claim 4, wherein the fermentation lid comprises:
   a fermentation lid hole that is configured to communicate with the bracket accommodating space and through which the at least one tube passes, and
   an inner space formed inside the fermentation lid to accommodate the at least one tube.

7. The beverage maker of claim 4, wherein the fermentation tank comprises a pair of hinge shaft supports configured to rotatably support the hinge shaft, and
   the bracket comprises:
   a hinge shaft fixing portion disposed between the pair of hinge shaft supports to surround a portion of the hinge shaft; and
   an elongation portion extending from the hinge shaft fixing portion, connected to the fermentation lid, and having the bracket accommodating space formed therein.

8. The beverage maker of claim 7, wherein each of the elongation portion and the bracket accommodating space is shaped having at least one bent portion.

9. The beverage maker of claim 1, wherein the bracket comprises:
   a main bracket on which the hinge shaft fixing portion fixed to the hinge shaft is disposed; and
   a tube cover,
   whereby the tube cover and the main bracket are configured to surround the at least one tube.

10. The beverage maker of claim 1, wherein the hinge shaft has an open end, and
    one end of the at least one tube extends to the outside of the hinge shaft through the open end of the hinge shaft.

11. The beverage maker of claim 1, wherein a fitting is connected to the at least one tube, and
an outer tube is connected to the fitting.

12. The beverage maker of claim 11, wherein the fitting comprises:
a tube connecting portion connected to the at least one tube; and
an outer tube connecting portion connected to the outer tube.

13. The beverage maker of claim 12, wherein the tube connecting portion is smaller than the hinge shaft space,
at least a portion of the tube connecting portion is disposed between the at least one tube and the hinge shaft, and
the outer tube connecting portion is connected to the outer tube at the outside of the hinge shaft.

14. The beverage maker of claim 1, wherein the at least one tube comprises a plurality of tubes that are accommodated in the hinge shaft space,
the hinge shaft has both ends thereof that are open,
one of the plurality of tubes extends to the outside of the hinge shaft through one end of the hinge shaft; and
the other of the plurality of tubes extends in a direction opposite to the one tube of the plurality of tubes and extends through the other end of the hinge shaft.

15. The beverage maker of claim 14, further comprising a main fitting to which a main outer tube is connected is connected to one of the plurality of tubes,
a sub fitting to which a sub outer fitting is connected is connected to the other of the plurality of tubes, and
the main fitting and the sub fitting are spaced apart from each other.

\* \* \* \* \*